(12) United States Patent
Carmiel et al.

(10) Patent No.: US 11,848,005 B2
(45) Date of Patent: Dec. 19, 2023

(54) VOICE ATTRIBUTE CONVERSION USING SPEECH TO SPEECH

(71) Applicant: Meaning.Team, Inc, Baltimore, MD (US)

(72) Inventors: Yishay Carmiel, Even Yehuda (IL); Lukasz Wojciak, Rosnowo (PL); Piotr Zelasko, Baltimore, MD (US); Jan Vainer, Plzen (CZ); Tomas Nekvinda, Dolni Ujezd (CZ); Ondrej Platek, Prague (CZ)

(73) Assignee: Meaning.Team, Inc, Baltimore, MD (US)

( * ) Notice: Subject to any disclaimer, the term of this patent is extended or adjusted under 35 U.S.C. 154(b) by 0 days.

(21) Appl. No.: 17/731,474

(22) Filed: Apr. 28, 2022

(65) Prior Publication Data

US 2023/0352001 A1 Nov. 2, 2023

(51) Int. Cl.
*G10L 15/06* (2013.01)
*G10L 25/21* (2013.01)
(Continued)

(52) U.S. Cl.
CPC .......... *G10L 15/063* (2013.01); *G10L 21/055* (2013.01); *G10L 21/10* (2013.01); *G10L 25/21* (2013.01)

(58) Field of Classification Search
CPC ..... G10L 15/063; G10L 21/055; G10L 21/10; G10L 25/21
See application file for complete search history.

(56) References Cited

U.S. PATENT DOCUMENTS 5,617,507 A * 4/1997 Lee .................. G10L 21/04
704/E13.007
8,401,856 B2 3/2013 Jennings
(Continued)

FOREIGN PATENT DOCUMENTS

DE 69826446 1/2005
WO WO 98/35340 8/1998

OTHER PUBLICATIONS

Tralie et al., "Exact, Parallelizable Dynamic Time Warping Alignment With Linear Memory," 21st International Society for Music Information Retrieval Conference, Montréal, Canada, 2020 (available at https://program.ismir2020.net/static/final_papers/343.pdf) (Year: 2020).*

(Continued)

*Primary Examiner* — Michelle M Koeth

(57) ABSTRACT

There is provided a computer-implemented method of training a speech-to-speech (S2S) machine learning (ML) model for adapting at least one voice attribute of speech, comprising: creating an S2S training dataset of a plurality of S2S records, wherein an S2S record comprises: a first audio content comprising speech having at least one first voice attribute, and a ground truth label of a second audio content comprising speech having at least one second voice attribute, wherein the first audio content and the second audio content have the same lexical content and are time-synchronized, and training the S2S ML model using the S2S training dataset, wherein the S2S ML model is fed an input of a source audio content with at least one source voice attribute and generates an outcome of the source audio content with at least one target voice attribute.

23 Claims, 11 Drawing Sheets

(51) Int. Cl.
    *G10L 21/10*     (2013.01)
    *G10L 21/055*     (2013.01)

(56) References Cited

U.S. PATENT DOCUMENTS

| | | | | |
|---|---|---|---|---|
| 8,751,239 | B2* | 6/2014 | Tian | G10L 21/00 |
| | | | | 704/266 |
| 9,177,549 | B2 | 11/2015 | Agiomyrgiannakis | |
| 9,484,017 | B2 | 11/2016 | Sumita et al. | |
| 10,176,819 | B2 | 1/2019 | Sun et al. | |
| 10,614,826 | B2* | 4/2020 | Huffman | G10L 19/018 |
| 11,138,970 | B1* | 10/2021 | Han | G06F 21/6245 |
| 2022/0068257 | A1* | 3/2022 | Biadsy | G10L 15/22 |
| 2022/0115028 | A1 | 4/2022 | Dhawan | |
| 2022/0122579 | A1 | 4/2022 | Biadsy et al. | |

OTHER PUBLICATIONS

Al-Radhi et al., "Parallel Voice Conversion Based on a Continuous Sinusoidal Model," 2019 International Conference on Speech Technology and Human-Computer Dialogue (SpeD), 2019, pp. 1-6, doi: 10.1109/SPED.2019.8906565. (Year: 2019).*

Zhang et al., "Improving Sequence-to-sequence Voice Conversion by Adding Text-supervision," ICASSP 2019—2019 IEEE International Conference on Acoustics, Speech and Signal Processing (ICASSP), 2019, pp. 6785-6789, doi: 10.1109/ICASSP.2019.8682380. (Year: 2019).*

Mohammadi et al., "An overview of voice conversion systems," Speech Communication, vol. 88, 2017, pp. 65-82, ISSN 0167-6393, https://doi.org/10.1016/j.specom.2017.01.008. (Year: 2017).*

Jia et al., "Transfer learning from speaker verification to multispeaker text-to-speech synthesis", Advances in NeurIPS, 2018 (Year: 2018).*

Cheng et al., "ETEH: Unified Attention-Based End-to-End ASR and KWS Architecture," in IEEE/ACM Transactions on Audio, Speech, and Language Processing, vol. 30, pp. 1360-1373, Mar. 22, 2022, doi: 10.1109/TASLP.2022.3161159. (Year: 2022).*

Jemine, C., Master thesis : Real-Time Voice Cloning, 2019, Université de Liège, Liège, Belgique. Retrieved from https://matheo.uliege.be/handle/2268.2/6801 (Year: 2019).*

Biadsy et al. "Parrotron: An End-to-End Speech-to-Speech Conversion Model and its Applications to Hearing-Impaired Speech and Speech Separation", Electrical Engineering and Systems Science; Audio and Speech Processing, ArXiv:1904.04169, 5P., Apr. 2019.

Biasdy "Parrotron: New Research into Improving Verbal Communication for People with Speech Impairments", Google, AI Blog. 6P., Jul. 17, 2019.

Kameka et al. "Non-Parallel Many-to-Many Voice Conversion with Star Generative Adversarial Networks; Samples".

Kameoka et al. "StarGAN-VC: Non-Parallel Many-to-Many Voice Conversion with Star Generative Adversarial Networks",Arxiv 1806.02169,Computer Science; Sound, 9P., Jun. 29, 2018.

Qian et al. "Auto VC: Zero-Shot Voice Style Transfer with Only Autoencoder Loss—Audio Demo", Samples, 7P., 2019.

Qian et al. "AUTOVC: Zero-Shot Voice Style Transfer with Only Autoencoder Loss", ArXiv:1905.05879v2, Electrical Engineering and Systems Science; Audio and Speech Processing: 12P., May 2019.

Ryu et al. English Abstract, Description and Claims.

Zhao et al. "Foreign Accent Conversion by Synthesizing Speech from Phonetic Posteriorgrams", Department of Computer Science and Engineering, Texas A&M University: 1P., 2019.

Zhao et al. "Foreign Accent Conversion by Synthesizing Speech from Phonetic Posteriorgrams", Posteriorgrams, Proc. Interspeech: 2843-2847, 2019.

International Search Report and the Written Opinion dated Aug. 20, 2023 From the International Searching Authority Re. Application No. PCT/IB2023/054378. (11 Pages).

* cited by examiner

VOICE ATTRIBUTE CONVERSION USING SPEECH TO SPEECH

FIELD AND BACKGROUND OF THE INVENTION

The present invention, in some embodiments thereof, relates to machine learning models and, more specifically, but not exclusively, to systems and methods for training a machine learning model for speech conversion.

Computer programs, such as based on machine learning models, have been developed for converting spoke speech to text, for example, for recognizing key words, and performing an internet search based on the key words. Other programs convert text to speech, for example, for reading text documents to the visually impaired.

SUMMARY OF THE INVENTION

According to a first aspect, a computer-implemented method of training a speech-to-speech (S2S) machine learning (ML) model for adapting at least one voice attribute of speech, comprises: creating an S2S training dataset of a plurality of S2S records, wherein an S2S record comprises: a first audio content comprising speech having at least one first voice attribute, and a ground truth label of a second audio content comprising speech having at least one second voice attribute, wherein the first audio content and the second audio content have the same lexical content and are time-synchronized, and training the S2S ML model using the S2S training dataset, wherein the S2S ML model is fed an input of a source audio content with at least one source voice attribute and generates an outcome of the source audio content with at least one target voice attribute.

According to a second aspect, a computer implemented method of near real-time adaptation of at least one voice attribute, comprises: feeding a source audio content comprising speech having at least one source voice attribute into a S2S ML model trained according to the first aspect, and obtaining a target audio content as an outcome of the S2S ML model for playing on a speaker, wherein the target audio content comprises at least one target voice attribute of the source audio content, and the target audio content and the source audio content have the same lexical content and are time-synchronized.

According to a third aspect, a system for training a speech-to-speech (S2S) machine learning (ML) model for adapting at least one voice attribute of speech, comprises: at least one hardware processor executing a code for: creating a S2S training dataset of a plurality of S2S records, wherein a S2S record comprises: a first audio content comprising speech having at least one first voice attribute, and a ground truth label of a second audio content comprising speech having at least one-second voice attribute, wherein the first audio content and the second audio content have the same lexical content and are time-synchronized, and training the S2S ML model using the S2S training dataset, wherein the S2S ML model is fed an input of a source audio content with at least one source voice attribute and generates an outcome of the source audio content with at least one target voice attribute.

According to a fourth aspect, a non-transitory medium storing program instructions for training a speech-to-speech (S2S) machine learning (ML) model for adapting at least one voice attribute of speech, which, when executed by a processor, cause the processor to: create an S2S training dataset of a plurality of S2S records, wherein an S2S record comprises: a first audio content comprising speech having at least one first voice attribute, and a ground truth label of a second audio content comprising speech having at least one-second voice attribute, wherein the first audio content and the second audio content have the same lexical content and are time-synchronized, and train the S2S ML model using the S2S training dataset, wherein the S2S ML model is fed an input of a source audio content with at least one source voice attribute and generates an outcome of the source audio content with at least one target voice attribute.

In a further implementation form of the first, second, third, and fourth aspects, the S2S ML model generate the outcome of the source audio content with at least one target voice attribute as time aligned and having the same duration of the input source audio content with at least one source voice attribute, and each word and other non-verbal expressions of the outcome of the source audio content is spoken at the same time as the input source audio content.

In a further implementation form of the first, second, third, and fourth aspects, at least one voice attribute comprises a non-verbal aspect of speech, selected from a group comprising: pronunciation, accent, voice timbre, voice identity, emotion, expressiveness, gender, age, and body type.

In a further implementation form of the first, second, third, and fourth aspects, further comprising: creating a text-to-speech (TTS) training dataset of a plurality of TTS records, wherein a TTS record comprises a text transcription of a third audio content comprising speech having at least one-second voice attribute, and a ground truth indication of the third audio content comprising speech having at least one second voice attribute, training a TTS ML model on the TTS training dataset, wherein the S2S record of the S2S training dataset is created by: feeding the first audio content comprising speech having the at least one first voice attribute into the TTS ML model, wherein the first audio content is of the S2S record, and obtaining the second audio content comprising speech having at least one second voice attribute as an outcome of the TTS ML model, wherein the second audio content is of the S2S record.

In a further implementation form of the first, second, third, and fourth aspects, further comprising segmenting the first audio content into a plurality of single utterances, wherein the S2S record is for a single utterance.

In a further implementation form of the first, second, third, and fourth aspects, feeding the first audio content into the TTS model further comprises: feeding the first audio content into a speech recognition alignment component that in response to an input of the first audio content and text transcript of the first audio content, generates an outcome of word-level start and end time stamps, and feeding the words with corresponding word-level start and end time stamps into the TTS model for obtaining the second audio content as the outcome of the TTS, wherein the text transcript is the same for the first audio content and the second audio content.

In a further implementation form of the first, second, third, and fourth aspects, the TTS ML model comprises: a voice attribute encoder that at least one of: dynamically generates the second audio content having the at least one second voice attribute in response to an input of a third audio content comprising speech having the at least one second voice attribute, statically generates the second audio content having the at least one second voice attribute in response to a selection of the at least one second voice attribute from a plurality of candidate voice attributes, and statistically generates the second audio content having the at least one second voice attribute, an encoder-decoder that generates a spectrogram in response to an input of the words and corresponding word-level start and end time stamps, a duration based modeling predictor and controller that controls durations of phones of the second audio content in response to an input of word durations defined by the word-level start and end time stamps, and a vocoder that generates time-domain speech from the spectrogram.

In a further implementation form of the first, second, third, and fourth aspects, verbal content and at least one non-verbal content of the first audio content is preserved in the second audio content and the S2S ML model is trained for preserving verbal content and at least one non-verbal content of the source audio content.

In a further implementation form of the first, second, third, and fourth aspects, at least one non-verbal content is selected from a group comprising: tone of speech, rate of speech, utterance duration, emotional state, and voice clarity.

In a further implementation form of the first, second, third, and fourth aspects, further comprising: feeding the first audio content into a feature extractor that generates a first type of a first intermediate acoustic representation of the first audio content, feeding the first type of the first intermediate representation into an analyzer component that generates a second type of the first intermediate acoustic representation of the first audio content, at least one of: (i) feeding the second audio content into a voice attribute encoder that generates a second intermediate acoustic representation of the at least one second voice attribute of the second audio content, and (ii) obtaining the second intermediate acoustic representation of the second audio by indicating the at least one second voice attribute of the second audio content, combining the second type of the first intermediate acoustic representation of the first audio with the second intermediate acoustic representation of the second audio to obtain a combination, and feeding the combination into a synthesizer component that generates a third intermediate acoustic representation representing the first audio content having the at least one second voice attribute, wherein the S2S record includes at least one of: (i) the combination and the ground truth label comprises the third intermediate acoustic representation, and (ii) the second type of the first intermediate acoustic representation of the first audio content, and the ground truth comprises the third intermediate acoustic representation.

In a further implementation form of the first, second, third, and fourth aspects, the third intermediate acoustic representation is designed for being fed into a vocoder that generates and outcome for playing on a speaker with the at least one second voice attribute while preserving lexical content and non-adapted non-verbal attributes of the first audio content.

In a further implementation form of the first, second, third, and fourth aspects, a respective S2S ML model is separately trained for each selected second voice attribute.

In a further implementation form of the first, second, third, and fourth aspects, the S2S record of the S2S training dataset further includes an indication of a certain at least one second voice attribute selected from a plurality of voice attributes, and the S2S ML model is further fed the at least one target voice attribute for generating the outcome of the source audio content having the at least one target voice attribute.

In a further implementation form of the first, second, third, and fourth aspects, further comprising: feeding the source audio content into a feature extractor that generates a first type of a first intermediate acoustic representation of the source audio content.

In a further implementation form of the first, second, third, and fourth aspects, the first type of the first intermediate acoustic representation comprises a power-spectrum.

In a further implementation form of the first, second, third, and fourth aspects, further comprising: feeding the first type of the first intermediate representation into an analyzer component that generates a second type of the first intermediate acoustic representation of the source audio content.

In a further implementation form of the first, second, third, and fourth aspects, the second type of the first intermediate acoustic representation comprises a temporal sequence of learned neural network representations of spoken content of the source audio content.

In a further implementation form of the first, second, third, and fourth aspects, further comprising: at least one of: (i) obtaining a sample audio content having the at least one target voice attribute, feeding the sample audio content into a voice attribute encoder that generates a second intermediate acoustic representation of the at least one target voice attribute of the sample audio content, and (ii) obtaining the second intermediate acoustic representation of the at least one target voice attribute according to an indication of the at least one target voice attribute.

In a further implementation form of the first, second, third, and fourth aspects, the second intermediate acoustic representation comprises a fixed-size vector representation of the encoded at least one target voice attribute.

In a further implementation form of the first, second, third, and fourth aspects, the indication of the at least one target voice attribute is selected from a plurality of candidate voice attributes that are learned during training.

In a further implementation form of the first, second, third, and fourth aspects, further comprising: combining the second type of the first intermediate acoustic representation of the first audio with the second intermediate acoustic representation of the at least one target voice attribute to obtain a combination, and feeding the combination into a synthesizer component that generates a third intermediate acoustic representation representing the source audio content having the at least one target voice attribute.

In a further implementation form of the first, second, third, and fourth aspects, further comprising feeding the third intermediate acoustic representation into a vocoder component that generates an outcome having the at least one target voice attribute for playing on a speaker while preserving lexical content and non-adapted non-verbal attributes of the source audio content.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
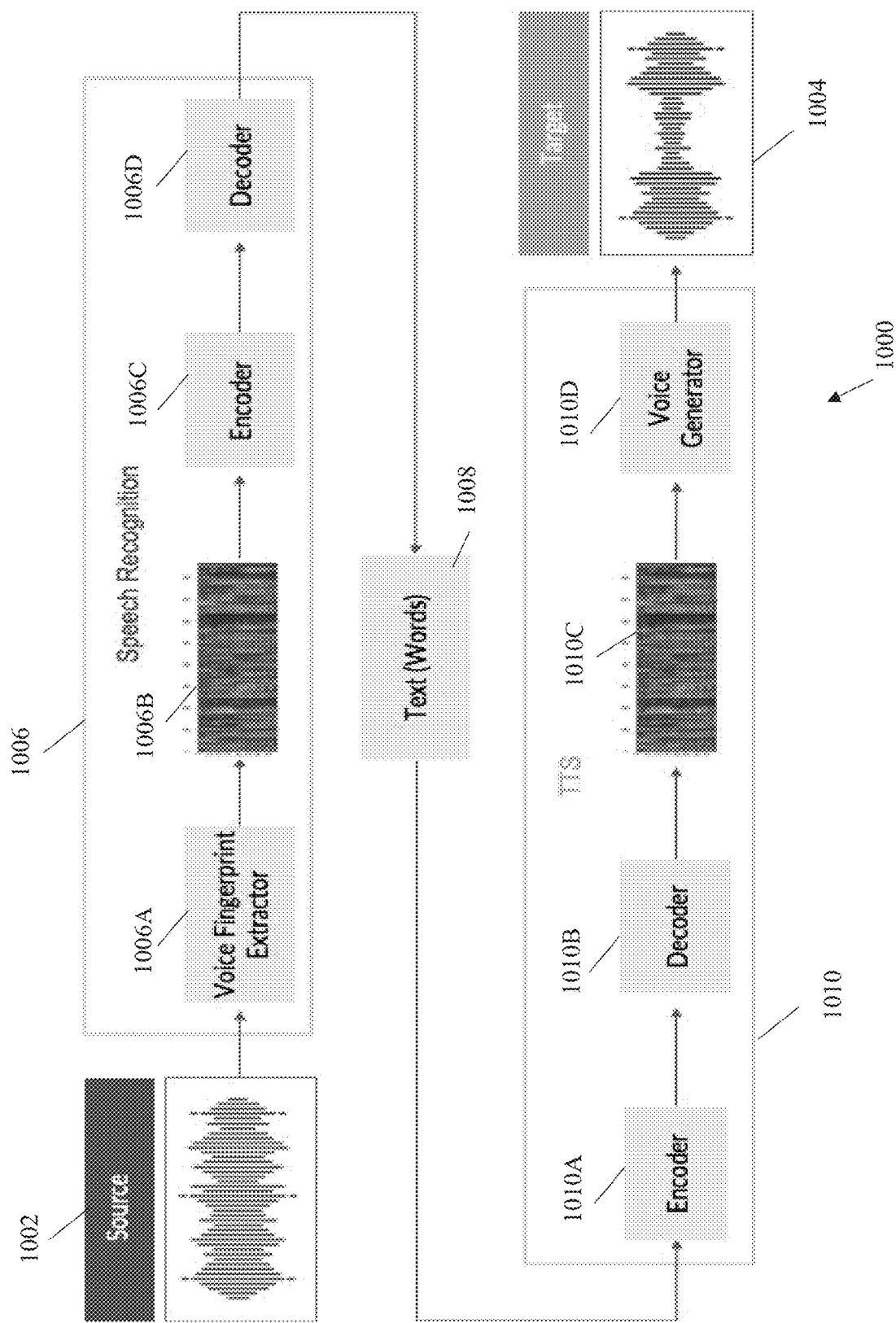
FIG. 1 is a dataflow diagram depicting conversion of an audio source speech to an audio target based on existing approaches, to help understand technical improvements of embodiments described herein over existing approaches.

The present invention, in some embodiments thereof, relates to machine learning models and, more specifically, but not exclusively, to systems and methods for training a machine learning model for speech conversion.

As used herein, the term audio content refers to a voice representation of a person speaking (e.g., talking, shouting, singing, whispering). Examples of audio content include: PCM/WAVE or any other audio codec, "classical" signal processing features: log Mel filter energies (commonly: "thank"), Mel frequency cepstral coefficients (MFCC), pitch features (fundamental tone frequency, formant frequencies), short-term signal energy, and learned features which may be outputs of another neural network.

At least some implementations of the systems, methods, computing devices, and/or code instructions (e.g., stored on a data storage device and executable by one or more processors) train a speech-to-speech (S2S) machine learning (ML) model for adapting one or more voice attribute of speech. The voice attribute(s) of speech are non-verbal aspects of the speech, for example, pronunciation, accent, voice timbre, voice identity, emotion, and expressiveness. The voice attributes may vary between different people or in the same person at different states, for example according to gender, age, and body type. An S2S training dataset of S2S records is created. An S2S record includes a first audio content including speech having one or more first voice attributes. The S2S record further includes a ground truth label of a second audio content including speech having one or more second voice attributes that are different than the first voice attributes, for example, a different accent and/or different voice identity, and/or different expressed emotion. The first audio content and the second audio content have the same lexical content and/or the same non-verbal content and/or are time-synchronized and/or have the same other voice attributes (i.e., other than the first voice attribute which is converted to the second voice attribute). The lexical content may include a sequence of words with their start and end timestamps relative to the start of the recording. The time-synchronization may include identical (or similar) rates of speech and/or preserved lip synchronization (e.g., to the largest extent possible). The S2S ML model is trained on the S2S training dataset.

In response to the trained S2S ML model being fed an input of a source audio content with source voice attribute(s), an outcome of a target audio content is obtained, for example, for playing on a speaker and/or storage for future playback. The target audio content has the target voice attribute while preserving lexical content and/or non-verbal content and/or timing of the source audio content. This allows, for example, real time conversion of one accent to another accent during a phone conversation (e.g., non-native to native), and/or adapting a voice identity of a user to a voice identity of a character during an online multi-participant game, and/or changing a gender of a voice (e.g., gendered such a male to gender-neutral).

Optionally, the second audio content with second voice attribute is obtained as an outcome of a trained TTS ML model fed the first audio content. The TTS ML model is trained on a TTS training dataset of TTS records. A TTS record includes a text transcript of a sample audio content with the second voice attribute, and a ground truth indication of the sample audio content with the second voice attribute. Prior to being fed into the TTS ML model, the first audio content may be fed into a speech recognition alignment component that in response to an input of the first audio content and text transcript of the first audio content, generates an outcome of word-level start and end time stamps. The words with corresponding word-level start and end time stamps are fed into the TTS model for obtaining the second audio content with second voice attribute. The text transcript is the same for the first audio content and the second audio content.

At least some implementations described herein address the technical problem of transforming a source voice attribute into another target voice attribute. For example, to enable communicating with others more easily, asserting privacy online, or creating an immersive experience in virtual reality and video games.

At least some implementations described herein improve the technical field of speech analysis and/or speech synthesis, by providing approaches for transforming a source voice attribute into another target voice attribute. In at least some implementations, the improvement includes performing conversion of voice recording and/or streams, with one or more of:

In real time or near real time, with very low latency (e.g., that is not perceptible to a human listener, i.e., the human listener cannot distinguish between normal speech and the converted speech, and/or latency might be noticeable by a human listener but does not hamper the communication with the interlocutor, and/or the human listener cannot identify latency).

High quality of transformed speech, preserving speech intelligibility while transforming the speaker's voice and/or other voice attributes.

At least some implementations described herein improve upon other approaches. Such other approaches are different than embodiments described herein, and none of the other approaches enable changing a voice attribute such as accent, in real-time. Without the real-time requirement, standard available speech synthesizers or open-source code that allows performing voice conversion may be used offline. For example, a source signal (input voice) is analyzed using a speech recognition system. The speech recognition outputs the hypothesized words as text, which the system assumes were said. The text words are fed into a standard Text To Speech system to generate output speech. Such approach has the following limitations, which are improved by at least some embodiments described herein:

1. Accuracy: In most cases, a standard speech recognition system recognizes 10-20% words incorrectly. Most systems are trained on native data, so it is challenging to work on non-native data due to a larger fraction of errors. As a result, the wrong output is fed into the TTS system. Moreover, in such standard approaches, the synthesized speech quality is sub-par, and may require heavy tweaking to obtain an improvement. In contrast, in at least some embodiments described herein, which are trained on pairs of data, and/or which do not require recognizing words during inference, lead to low error rates.

2. Latency: Speech recognition introduces a latency that doesn't meet the requirements for real-time processing. So there is no possibility to provide transformation for a real-time conversation. Such standard approaches are performed off-line, and cannot be done in real time. Such existing solutions do not enable seamless communication in real-time. In contrast, in at least some embodiments described herein, latency is low and/or non-detectable to a human, enabling real time conversations where the user cannot detect a noticeable delay during the call.

3. Non-Verbal Preservation: In a conversation, there is much more information than the actual words. Converting the voice into words strips down this information, and a lot of the messaging is lost. In contrast, in at least some embodiments described herein, voice attributes, other than the selected voice attribute which is adapted, are preserved.

In another example, another approach is based on converting speech using phonetic posteriorgrams (PPGs). Such prior approach is limited to voice conversion, whereas at least some embodiments described herein enable converting other and/or selected voice attributes such as accent. Such prior approach is are limited to a "many-to-one" approach, i.e., different input voices are mapped to a single output voice. At least some embodiments described herein provide a "many-to-many" approach where the input voice may be converted to different sets of output voice attributes. At least some embodiments described herein use a completely learned representation for performing the conversion which handles the mismatch between two separately trained models, in contrast the PPG of the prior approach.

As a result, standard based approaches cannot serve as a good candidate for an accent conversion system.

At least some implementations described herein address the above described technical problem, and/or improve the above described field, by using a machine learning model trained on pairs of audio content and/or intermediate acoustic representations thereof, where one of the pair serves as ground truth, and the other of the pair represents input. The audio content pairs are of the same lexicon content (i.e., same spoke words) and vary in one or more voice attributes between the pair of audio content. The audio content pairs are synchronized in time, such that the same words are spoke at the same time. A sufficient amount of such pairs enables training a S2S ML model for real time adaptation of a voice attribute for an input of recorded speech. The audio content pairs also have the same or similar non-verbal content.

At least some implementations described herein address the technical problem of obtaining sufficient amount of training dataset for training a machine learning model for real time adaptation of one or more voice attributes of recorded speech. Transforming a voice or an attribute such as accent in real-time was considered science-fiction for a long time, for which little scientific research was dedicated. Anything published on these topics before 2012 used pure digital signal processing algorithms and tricks, and was not good enough to solve the problem. With the advent of deep neural networks in 2012, and their wider adoption for speech processing a few years later, there was a technological breakthrough that resulted in a very strong performance of speech recognition, speech synthesis, and voice conversion systems. These prior approaches however are not sufficient for real-time transformation of accent, as deep neural network systems require massive amounts of data to achieve good performance. Matched recording pairs the same person speaking the same content with different accents is typically not available and difficult to achieve.

At least some implementations described herein improve the field of training a machine learning model, by creating a large number of pairs of audio content and/or intermediate acoustic representations thereof, where one of the pair serves as ground truth, and the other of the pair represents input. The audio content pairs are of the same lexicon content (i.e., same spoke words) and vary in one or more voice attributes between the pair of audio content. The audio content pairs are synchronized in time, such that the same words are spoke at the same time. A sufficient amount of such pairs enables training a S2S ML model for real time adaptation of a voice attribute for an input of recorded speech. The pairs are created since it is difficult or nearly impossible to find pairs of audio recordings of the same lexical content and/or non-verbal content, that only differ in a selected voice attribute.

At least some implementations described herein address the above described technical problem, and/or improve the above described field, by obtaining one audio content with a certain voice attribute, converting the audio content to text and/or an intermediate acoustic representation, feeding the text and/or the intermediate acoustic representation into a S2S ML model that is trained to generate an outcome of the text and/or the intermediate acoustic representation with an adapted target voice attribute, and synthesizing the second of the pair from the adapted target voice attribute. This creates a pair of time synchronized, and speed aligned audio content, where the same words are spoken at the same time, with the difference being in one or more voice attributes (or in other words, to preserve the lip synchronization with the reference, real recording). The S2S ML model may be trained on a large number of created pairs.

At least some implementations described herein address the technical problem of background noise reduction and quality enhancement of speech recordings. Speech conversion is typically not an adequate solution for speech enhancement because it will transform the speaker's voice in some way. However, when a speaker desires for their voice to be transformed, at least some implementations described herein also remove the background noise and drastically improve the audio quality. The training according to at least some implementations described herein, transform the voices into high-quality audio synthesized with an expressive speech synthesizer. In contrast, existing approaches, such as deep neural network based speech enhancement (denoising) models, signal processing based algorithms (e.g. a Wiener filter), and microphone arrays combined with relevant signal processing algorithm, do not transform the speaker's voice or its attributes in any way.

At least some implementations described herein improve the technical field of background noise reduction and quality enhancement of speech recordings.

At least some implementations described herein address the above described technical problem, and/or improve the above described field, an ML model (e.g., a deep neural network) that is trained to ignore the background noise and any other audio distortions. Instead, the ML model is trained to understand the lexical content of a recorded utterance and transform it to high-quality speech obtained from a speech synthesizer. Due to the way it is trained, the ML model (e.g., deep neural network) is unable to output the same kind of background noise or audio artifacts resulting from poor recording equipment and conditions that are being seen in the input.

At least some implementations described herein provide the following features, which may address the above mentioned technical problem(s) and/or may improve the above mentioned technical field(s) and/or may be improvements over above discussed known approaches. For example:

Quality: Preserving the verbal and/or selected non-verbal content of the conversation and/or interaction. For example, the tone of speech, rate of speech, utterance duration, emotional state, and voice clarity.

Latency: In the case of real-time voice conversations, assuring low latency in the processing, for example, the latency might be noticeable by a human listener but does not hamper the communication with the interlocutor, or the human listener cannot fully identify the latency.

Scale: Support multiple voices, varying quality of recording hardware, multiple accents, low cost, fast user onboarding, and ability to move forward with the technology.

An exemplary application of adapting one or more voice attributes of a user using at least some implementations described herein is Accent Conversion. Approximately 70% of English speakers learned English as a secondary language. Almost three out of four spoken words in each English conversation are non-native. Moreover, of those who are native English speakers, different native English speakers in different locations have different accents, for example, British, Scottish, New York, Texas, Deep South, Australian, and South African. An accent conversion system based on implementations described herein uses cutting-edge voice AI to neutralize the accent and enhance every conversation or content. An accent conversion system based on implementations described herein transforms a non-native voice (Source) into a native voice (Target).

Another exemplary application is Voice Identity Conversion. There are approximately 700 million people using online voice and video communication systems. Some users of online voice platforms find the need to anonymize or in other way transform their voice to avoid online harassment or otherwise improve their experience. A Voice Identity Conversion system based on implementations described herein uses cutting-edge voice AI to make a user (Source) sound like a completely different person (Target).

Other exemplary application of adapting one or more voice attributes of a user using at least some implementations described herein include:

Content Creators: convert media content (Audio, Video) with user's speech into another voice. It may also neutralize the accent to improve the reception of the target audience. The content can be, for example, for an individual or for an Enterprise.

Service Agents: transform a non-native service agent voice (Call Center, Customer Success Manager, IT Support, etc.) to a native voice.

Sales Development Representative (SDR): transform a non-native sales agent voice to a native voice.

Consolidating Brand Identity: transform a customer care center agent's voice into a voice avatar that identifies the brand.

Gaming: transform the users' voice in an online video game to resemble the character they are playing or to mask their identity.

Metaverse: transform the users' voice in a virtual reality environment to allow full personalization of their virtual avatars.

At least some approaches described herein improve over existing approaches, for example:

Existing approaches are designed for off-line batch conversion. In contrast, at least some embodiments described herein are designed for real-time adaptation of voice attributes, such as during a live phone call and/or interactive game.

Some existing approaches use multiple stages of refinement to get the converted voice as close to as possible to a reference voice, given an example of the reference voice. The data being used is non-parallel (i.e., the two speakers are saying different things). In contrast, at least some embodiments described herein generate a second audio content from a first audio content, where the second audio content differs in one or more voice attributes from the first audio content, and preserves the lexical content and/or non-verbal content and/or other non-selected voice attributes and/or timing of the first audio content. The pairs of data generate a large training dataset for accurate training of the S2S ML model. The S2S ML model does not necessarily require a reference utterance during real-time inference, when the S2S ML has learned the target voice attribute.

Some existing approaches are based on the analysis of tones and harmonics in the input speech signal. Voice attributes are not changed, rather an "abnormal" voice is changed to a "normal" voice. In contrast, at least some embodiments described herein do not perform tone and/or harmonics analysis, and instead rely on the intermediate (e.g., vector) representations learned by the neural network. At least some embodiments described herein are capable of changing the voice timbre, and other voice attributes such as the accent.

Some existing approaches are based on comparison of the source speech segments to a codebook with entries of representative source speech units, and then mapping those codebook entries to target entries in a target codebook. In contrast, at least some embodiments described herein do not require the preparation or use of any such codebook for either the source or target voices. Instead, the S2S ML model described herein is trained with parallel recordings and may learn optimal representations to perform the speech conversion task.

Some existing approaches are based on leveraging a pre-trained Automatic Speech Recognition (ASR) system that is able to produce phonetic posteriorgrams (PPGs). Such system is trained to synthesize speech based on the PPG outputs for an ASR. This method is a many-to-one voice conversion, meaning that the synthesizer was trained on the recordings of a single speaker. In contrast, at least some embodiments described herein do not require to leverage a pre-trained ASR or to use PPGs. Instead, the S2S ML model described herein is trained by internally using its own learned representation of speech and speech units that does not have to correspond to PPGs. Furthermore, the S2S ML model may be trained to synthesize multiple voices instead of one.

Some existing approaches are based on a hidden Markov model (HMM) that may be used both to recognize and synthesize speech. Two such models are separately estimated for the source and target speaker, and then a mapping between them is found. The HMM models leverage additional hand-crafted features such as the fundamental voice frequency F0. In contrast, at least some embodiments described herein do not require using such hand-crafted features. Instead, the S2S ML model is trained jointly via supervised learning to transform the speech of any of the source speakers in our training dataset to any of the target speakers in our training dataset.

Reference is now made to FIG. 1, which is a dataflow diagram 1000 depicting conversion of an audio source speech 1002 to an audio target 1004 based on existing approaches, to help understand technical improvements of embodiments described herein over existing approaches. Source speech 1002 is fed into a speech recognition 1006 component 1006, which includes a voice finger print extractor 1006A that generates a log-Mel filter energy and/or spectrogram 1006B which is fed into an encoder 1006C and decoder 1006D. Decoder 1006D outputs text words 1008 of source 1002. Words 1008 are fed into a text to speech (TTS) component 1010 that synthesizes audio target 1002 from words 1008. TTS includes an encoder 1010A that receives text words 1008 as input, a decoder 1010B, that generates an intermediate representation 1010C, and a voice generator 1010D that outputs audio target 1004 in response to an input of intermediate representation 1010C.

Dataflow diagram 1000 performs speech recognition 1006 and TTS 1010 separately, using a log-Mel filter energy and/or spectrogram 1006B and spectrogram 1010C. The outputs of the types of systems based on dataflow diagram 1010 sound robotic and/or contain audible artifacts and/or contain mispronunciations not encountered in native speech due to mismatch between non-native representations (e.g., spectrograms) and native representation (e.g., spectrogram) expected by the TTS system.

Figure 2:
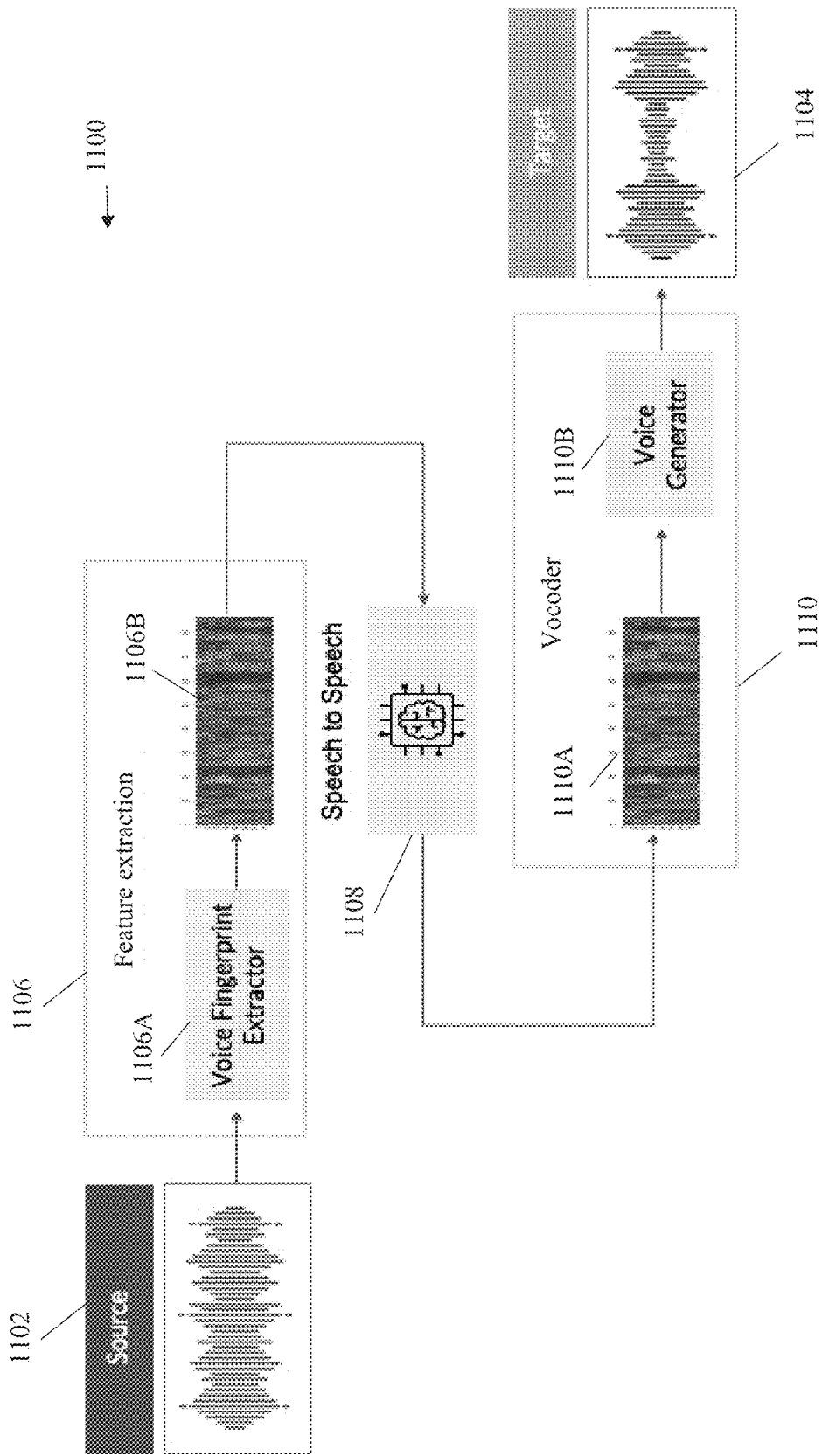
FIG. 2 is a high level dataflow diagram depicting conversion of an audio source speech to an audio target, in accordance with some embodiments of the present invention.

Reference is now made to FIG. 2, which is a high level dataflow diagram 1100 depicting conversion of an audio source speech 1102 to an audio target 1104, in accordance with some embodiments of the present invention. Dataflow diagram 1100 based on at least some embodiments described herein represents an improvement over existing approaches such as dataflow diagram 1000 descried with reference to FIG. 1. Audio target 1104 generated by high level dataflow 1100 from audio source 1102 are designed to sound natural, and not robotic, without or with reduced artifacts, in contrast to audio target 1004 generated by dataflow 1000 of FIG. 1 which sounds robotic with artifacts. In dataflow 1100, source audio content 1102 is converted into target audio content 1104 without being broken down to the text word level (as in diagram 1000), while preserving lexical content and/or time synchronization, with an adaptation of one or more selected voice attributes. In dataflow 1100, source audio content 1102 is fed into a voice fingerprint extractor 1106A of speech recognition component 1106. Voice fingerprint extractor 1106A outputs a log-Mel filter energy and/or spectrogram 1106B. It is noted that a single Speech-to-Speech component 1108 replaces the Speech Recognition 1006 and TTS 1010 components from FIG. 1. There is no intermediate representation such as text or PPGs; instead, 1108 performs end-to-end processing converting source speech spectrogram 1106B to target speech spectrogram 1110A. To obtain the target recording, 1110A is passed through a Vocoder 1110B. Log-Mel filter energy and/or spectrogram 1106B is fed into a speech to speech component 1108 which is implemented as, for example, a signal processing process and/or neural network. Speech to speech component 1108 converts log-Mel filter energy and/or spectrogram 1106B of source audio content 1102 which depicts a source voice attribute into an output intermediate representation 1110B that depicts a target voice attribute. Output intermediate representation 1110A is fed into a voice generator 1110B. Voice generator 1110B generates target audio 1104 which has a target voice attribute and preserves the same lexical content and is time synchronized with audio source 1102. For example, the accent and/or voice identity of source audio content 1102 is adapted to a target accent and/or target voice identity in target audio 1104. The speech to speech component 1108, i.e., machine learning model, which is trained to adapt voice attributes, enables generation of high quality target audio content with target voice attributes, in contrast to standard approaches that first convert speech in audio format to text words, and the convert the text words to audio speech.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
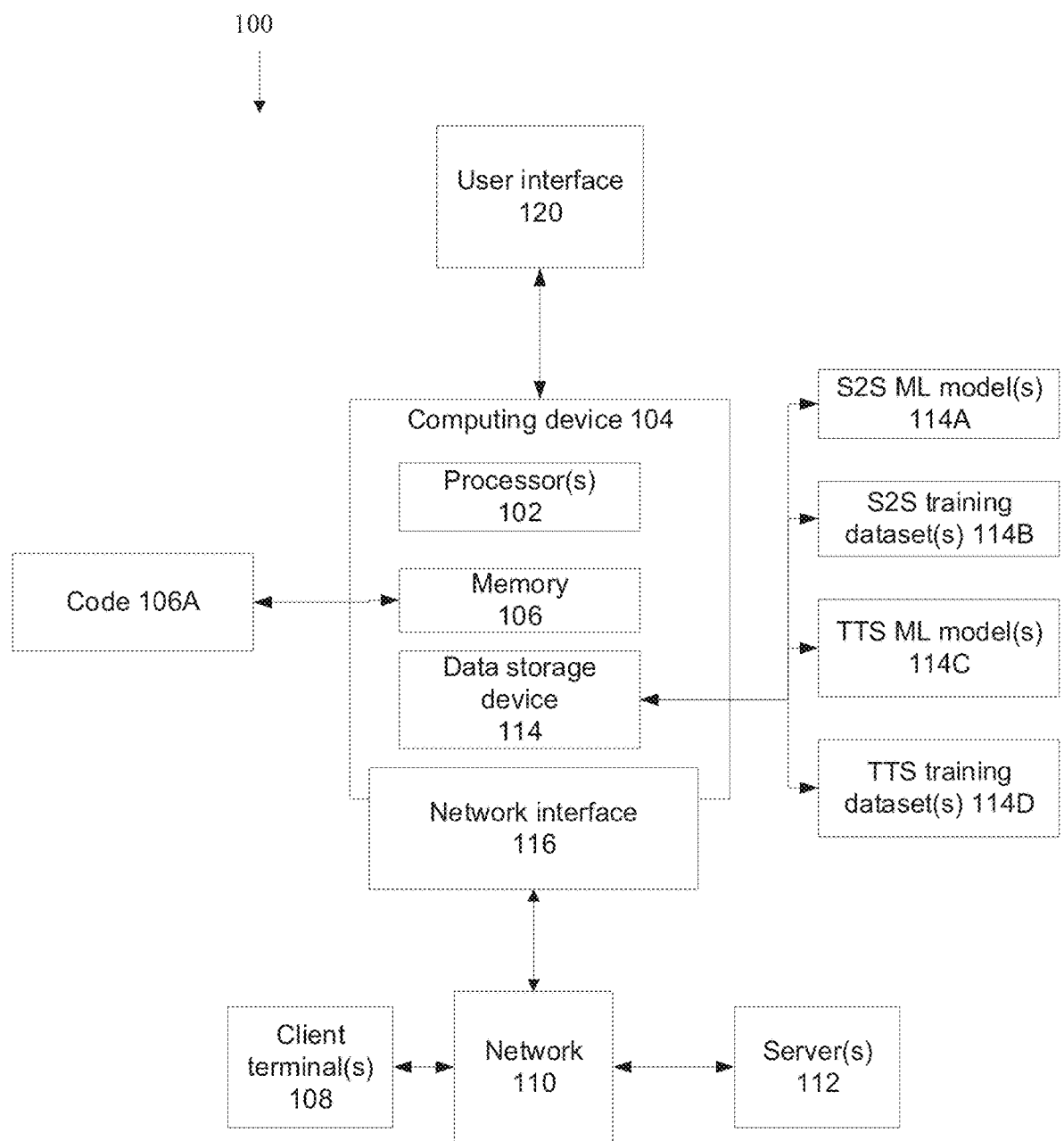
FIG. 3 is a block diagram of components of a system for training a speech-to-speech (S2S) machine learning (ML) model for converting a voice attribute of an audio content and/or for using the S2S ML model for converting the voice attribute of the audio content, in accordance with some embodiments of the present invention.
Figure 4:
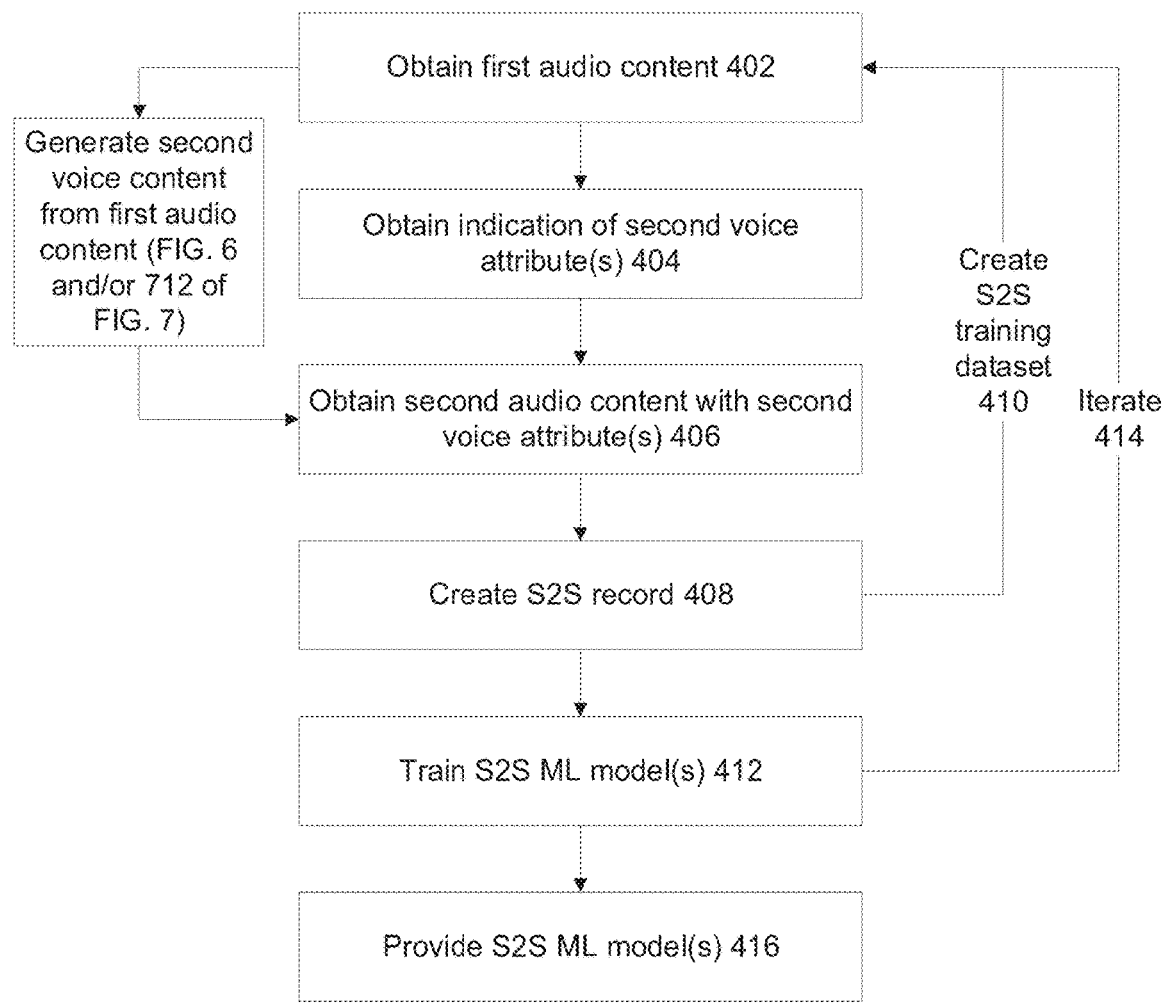
FIG. 4 is a flowchart of a method for training a S2S ML model for adapting at least one voice attribute of speech, in accordance with some embodiments of the present invention.
Figure 5:
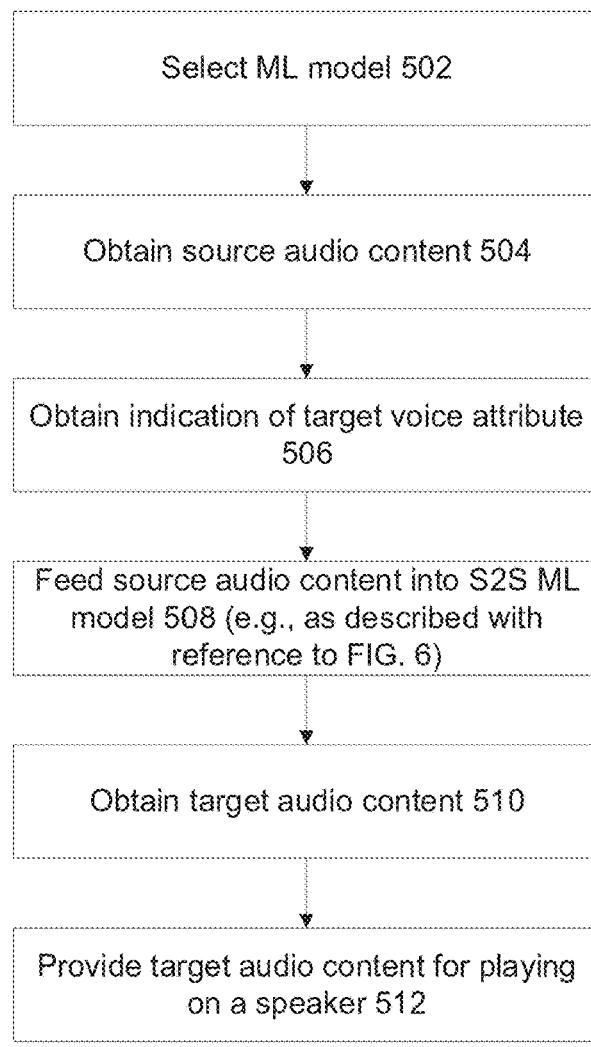
FIG. 5 is a flowchart of near real-time adaptation of at least one voice attribute, in accordance with some embodiments of the present invention.
Figure 6:
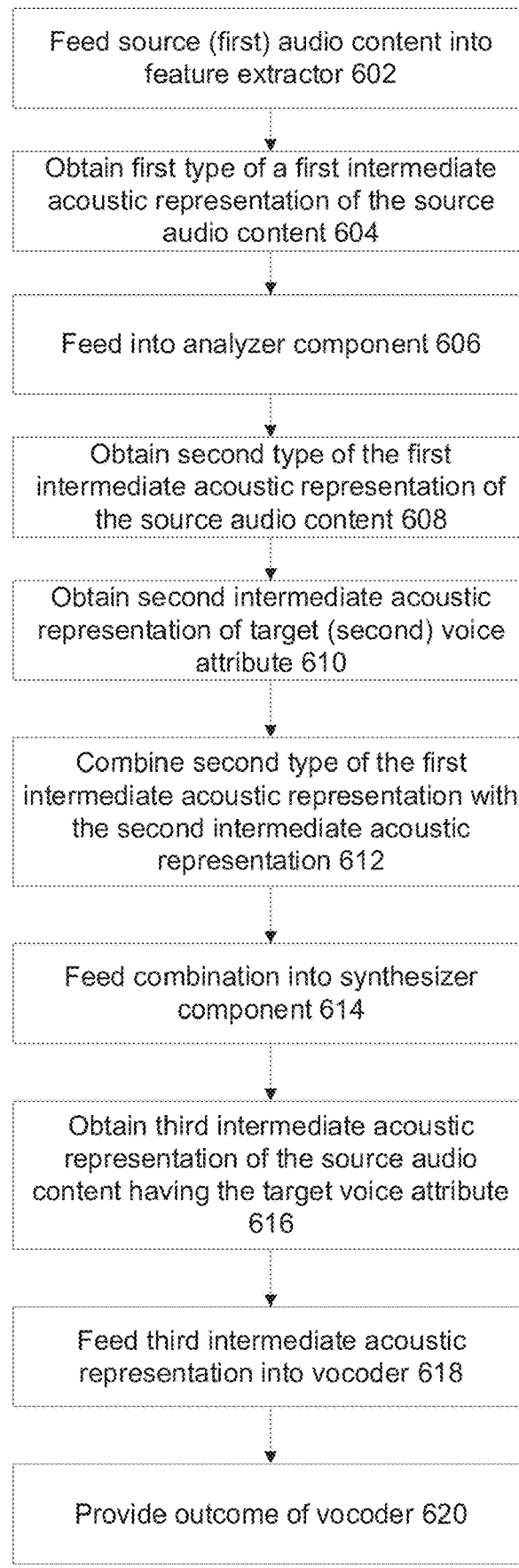
FIG. 6, is a flowchart of an exemplary process for obtaining the target audio content from the source audio content by the S2S ML model, accordance with some embodiments of the present invention.
Figure 7:
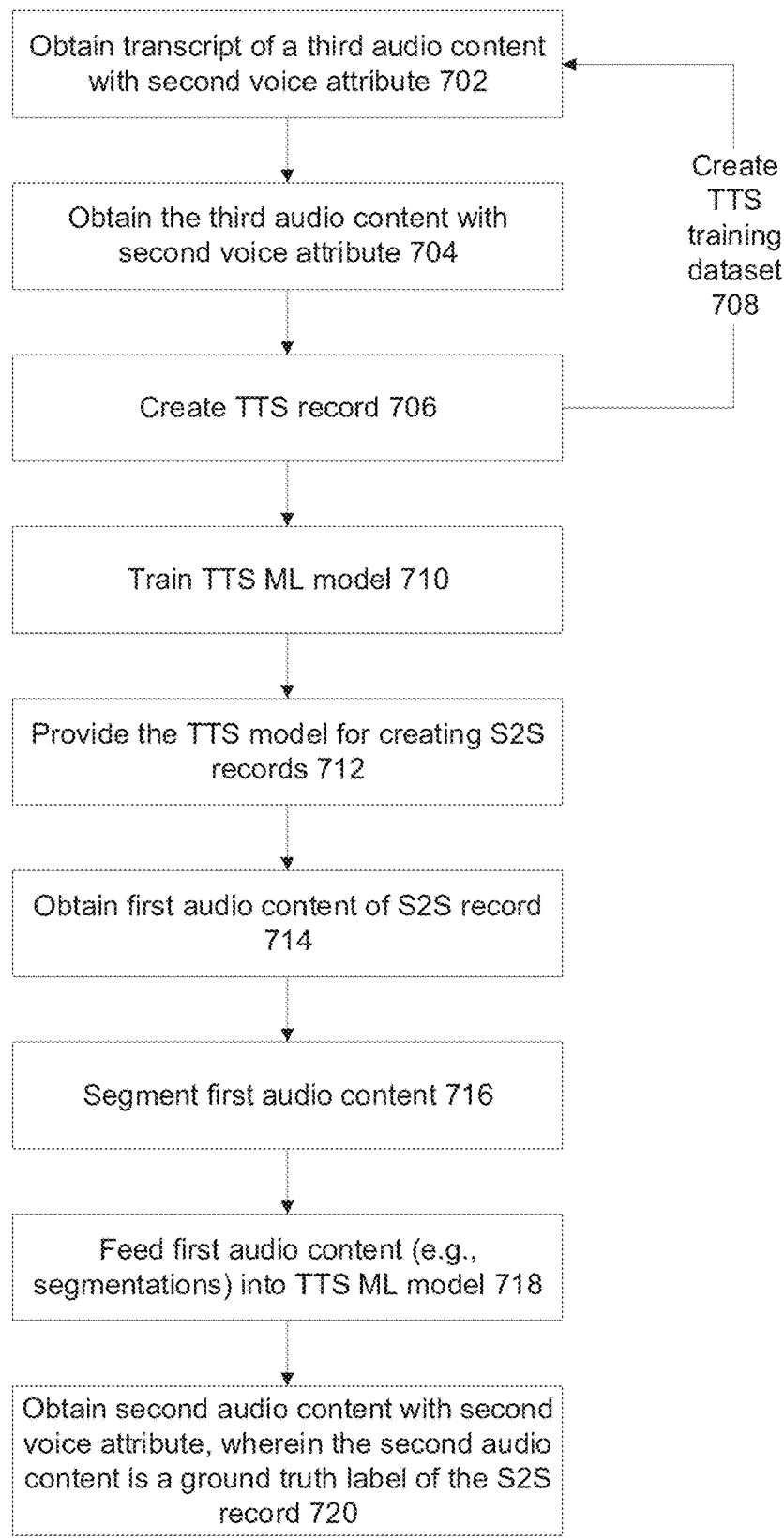
FIG. 7 is a flowchart of a method of creating a text-to-speech (TTS) training dataset and training a TTS ML model on the TTS training dataset, in accordance with some embodiments of the present invention.
Figure 8:
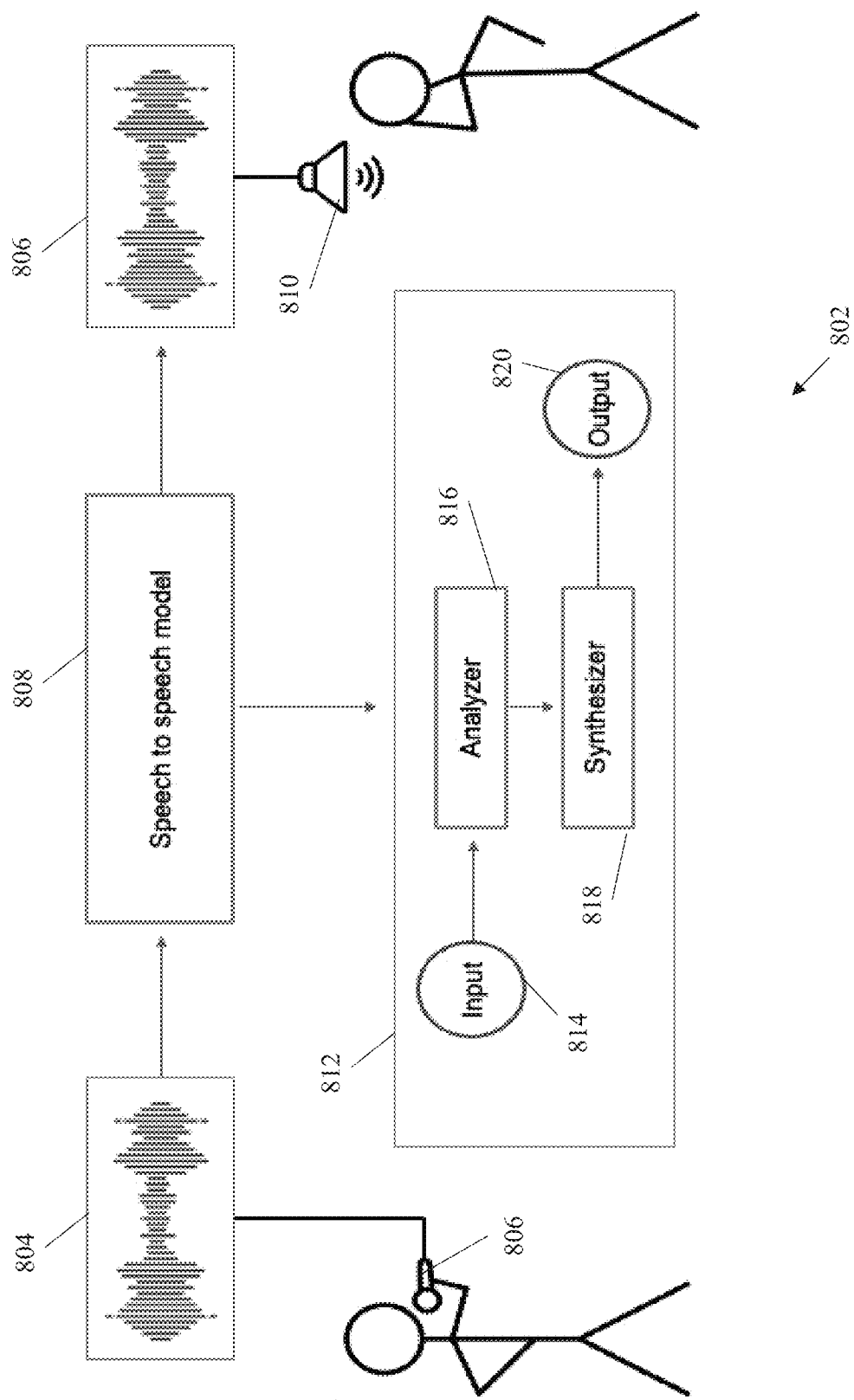
FIG. 8 is a schematic depicting real time conversion of a source audio content with source voice attribute converted into a target audio content with target voice attribute that preserves the lexical content and/or non-verbal content and/or timing and/or other voice attributes of the source audio content, in accordance with some embodiments of the present invention.
Figure 9:
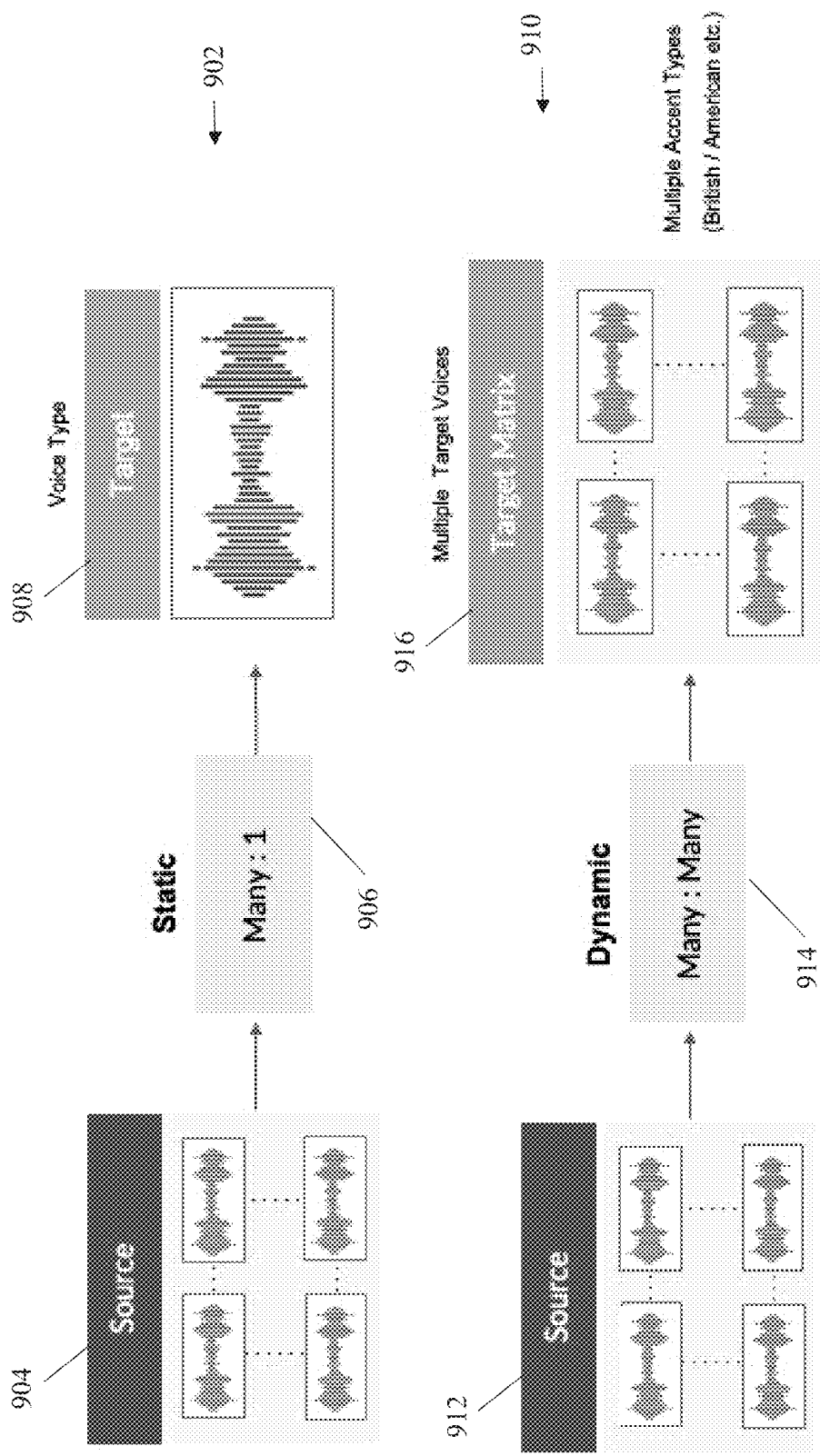
FIG. 9 is a schematic depicting different possible implementations of the S2S ML model, in accordance with some embodiments of the present invention.
Figure 10:
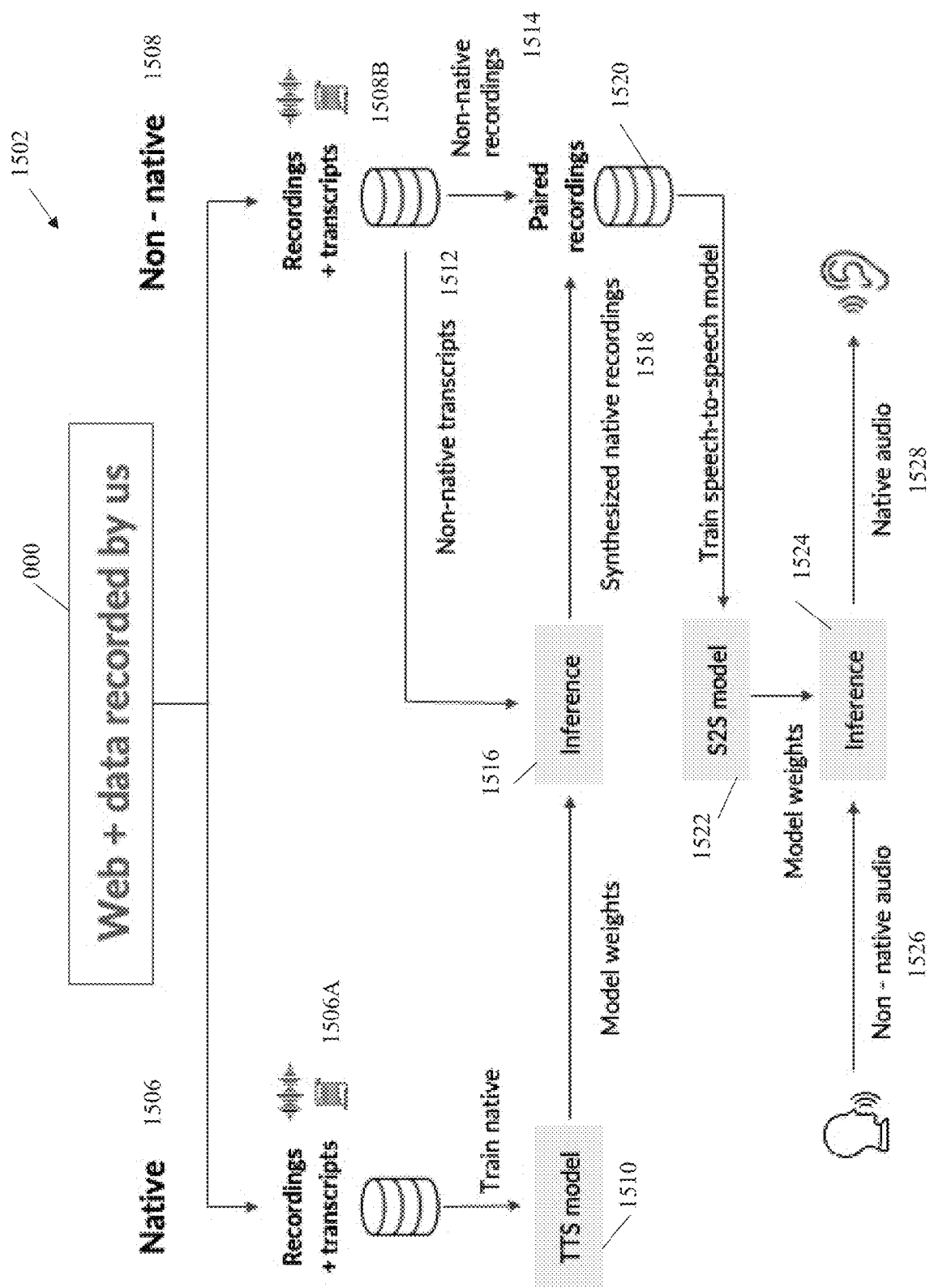
FIG. 10 is a dataflow diagram depicting an exemplary approach for creating pairs of audio content for training a S2S ML model, in accordance with some embodiments of the present invention.
Figure 11:
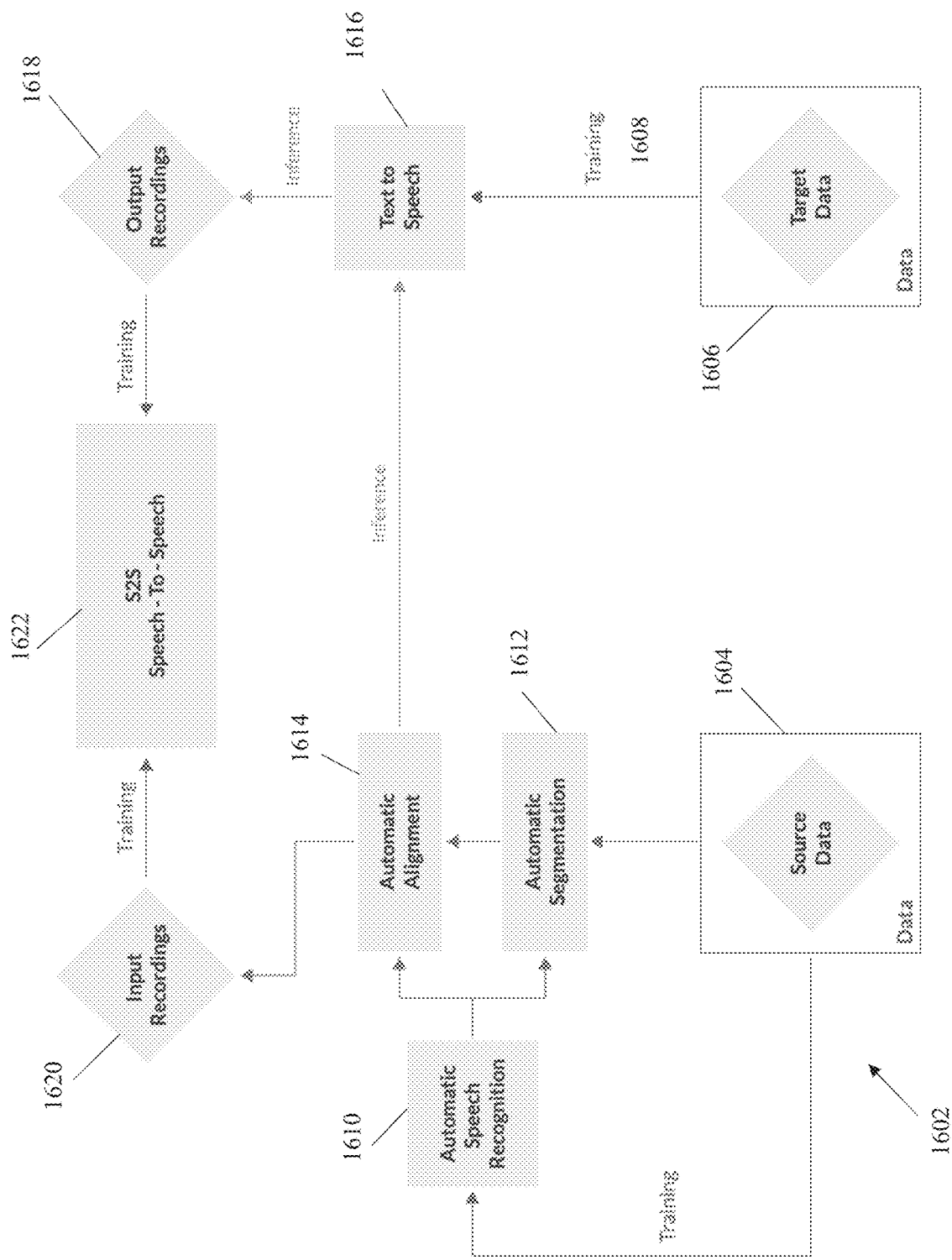
FIG. 11 is another dataflow diagram depicting an exemplary approach for creating pairs of audio content for training a S2S ML model, in accordance with some embodiments of the present invention.

Reference is now made to FIG. 3, which is a block diagram of components of a system 100 for training a S2S ML model for converting a voice attribute of an audio content and/or for using the S2S ML model for converting the voice attribute of the audio content, in accordance with some embodiments of the present invention. Reference is also made to FIG. 4, which is a flowchart of a method for training a speech-to-speech (S2S) machine learning (ML) model for adapting at least one voice attribute of speech, in accordance with some embodiments of the present invention. Reference is also made to FIG. 5, which is a flowchart of near real-time adaptation of at least one voice attribute, in accordance with some embodiments of the present invention. Reference is also made to FIG. 6, which is a flowchart of an exemplary process for obtaining the target audio content from the source audio content by the S2S ML model, accordance with some embodiments of the present invention. Reference is also made to FIG. 7, which is a flowchart of a method of creating a text-to-speech (TTS) training dataset and training a TTS ML model on the TTS training dataset, in accordance with some embodiments of the present invention. Reference is also made to FIG. 8, which is a schematic 802 depicting real time conversion of a source audio content 804 with source voice attribute converted into a target audio content 806 with target voice attribute that preserves the lexical content and/or non-verbal content and/or timing and/or other voice attributes of the source audio content, in accordance with some embodiments of the present invention. Reference is also made to FIG. 9, which is a schematic depicting different possible implementations of the S2S ML model, in accordance with some embodiments of the present invention. Reference is also made to FIG. 10, which is a dataflow diagram 1502 depicting an exemplary approach for creating pairs of audio content for training a S2S ML model, in accordance with some embodiments of the present invention. Reference is also made to FIG. 11, which is another dataflow diagram 1602 depicting an exemplary approach for creating pairs of audio content for training a S2S ML model, in accordance with some embodiments of the present invention.

System 100 may implement the acts of the method described with reference to FIGS. 2 and 4-11 by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual server, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

A local architecture. Computing device 104 executing stored code instructions 106A may be implemented as a standalone device, for example, a client terminal, or a smartphone. Computing device 104 locally trains S2S ML model 114A and/or TTS ML model 114C on respective training datasets. The training may be personalized, for example, trained using voice of the user of the computing device, and/or trained for a specific application for a user of the computing device such as changing an accent of the user to another accent (e.g., a local accent). Different computing devices which may be used by different users may have different training datasets for training their own personalized ML models. Computing device 104 locally performs inference using S2S ML model 114A in real time to adapt voice attributes, as described herein. This enables a customized real time adaptation of voice attributes, for example, for the user of the computing device. Different computing devices which may be used by different users may generate different voice attributes according to their own personalized trained ML models. For example, the S2S ML model is loaded on a smartphone of the user, for real time adaptation of a voice attribute of the user during phone calls made by the real.

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2 and 4-11) to one or more client terminals 108 over a network 110. For example, providing software as a service (SaaS) to the client terminal(s) 108, providing software services accessible using a software interface (e.g., application programming interface (API), software development kit (SDK)), providing an application for local download to the client terminal(s) 108, providing an add-on to a web browser running on client terminal(s) 108, and/or providing functions using a remote access session to the client terminals 108, such as through a web browser executed by client terminal 108 accessing a web site hosted by computing device 104. For example, Computing device 104 centrally trains S2S ML model 114A and/or TTS ML model 114C on respective training datasets, which are designed to adapt voice attributes of multiple users. Computing device 104 centrally performs inference using S2S ML model 114A in real time to adapt voice attributes for multiple users using client terminals 108, as described herein. This enables a centralized real time adaptation of voice attributes, for example, support people in a call center located in a first country having a first accent provide remote assistance to end users located in a second country having a second accent. All voice traffic is routed through computing device 104, for changing the first accent of the support people to the second accent, during real time conversations.

A combined local-central architecture. Computing device 104 may be implemented as a server that include locally stored code instructions 106A that implement one or more of the acts described with reference to FIGS. 2 and 4-11, while other acts described with reference to FIGS. 2 and 4-11 are handled by client terminal(s) 108 (e.g., external network connected devices). For example, S2S ML model 114A is trained by computing device 104, optionally using training data generated using TTS ML model 114C, as described herein. ML model 114A is provided to each client terminal 108 for local real time inference, for example, for real time adaptation of voice attributes of voices of users of respective client terminals. Computing device 104 may train a single main ML model 114A which is provided to multiple different client terminals. Alternatively or additionally, computing device 104 may train a respective customized ML model 114A for each individual client terminals, or for each group of client terminals. Each respective customized trained ML is locally used by respective individual client terminals or respective groups, for example, for real time adaptation of voices of respective users to different accents.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2 and 4-11 when executed by hardware processor(s) 102.

Computing device 104 may include a data storage device 114 for storing data, for example, the S2S ML model, the TTS ML model, the S2S training dataset, and the TTS training dataset, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 may be in communication with one or servers 112 via network 110. For example, server 112 routes phone calls between phones (e.g., client terminals 108). Computing device 104 may perform real time conversion of voice attributes of audio content that includes speech spoken by the different users during phone calls. In another example, computing device 104 obtains different audio content items from publicly available datasets hosted by server(s) 112.

Computing device 104 includes and/or is in communication with one or more physical user interfaces 120 that include a mechanism for a user to enter data (e.g., select target voice attribute) and/or view data (e.g., selected ML model). Exemplary user interfaces 120 include, for example, one or more of, a touchscreen, a display, a virtual reality display (e.g., headset), gesture activation devices, a keyboard, a mouse, and voice activated software using speakers and microphone.

Attention is now directed back to FIG. 4, which is a flowchart of a method for training a speech-to-speech (S2S) machine learning (ML) model for adapting at least one voice attribute of speech, in accordance with some embodiments of the present invention. It is noted that the first audio content and second audio content described herein may be reversed to create additional or alternative training data, i.e., the first audio content of a first record is used as the second audio content of a second record, and the second audio content of the first record is used as the first audio content of the second record.

The S2S ML model may be implemented, for example, as a LSTM encoder and/or LSTM decoder, transformer encoder and/or transformer decoder, or combinations thereof. It is noted that the transformer encoder is modified for enabling streaming, optionally block-wise, and/or recurrent, and/or causal attention.

Referring now back to FIG. 4, at 402, a first audio content is obtained, for example, from a sample individual. The first audio content includes speech having one or more first voice attributes. The voice attribute is a non-verbal aspect of the speech. Examples of voice attributes include: pronunciation, accent, voice timbre, voice identity, emotion, expressiveness, gender, age, and body type.

The first audio content may be of a preset length and/or different lengths, for example, length of a single word, a sentence, a paragraph, or longer. For example, 1, 5, 10, 30, 60 seconds, or intermediate or longer.

The first audio content may be represented in a suitable audio format, for example, analogue and/or digital representation.

At 404, an indication of one or more second voice attributes may be obtained. The second voice attribute may be selected from multiple voice attributes, for example, as an index and/or code. Alternatively, the target voice attribute may be extracted from a sample voice content of different content which depicts the target voice attribute.

The second voice attribute represents a selection of a target voice attribute from multiple candidate voice attributes for training the S2S ML model, to enable a user to perform such selection during inference.

The indication may be a sample audio content recording of a speaker having a voice attribute that is desired in the outcome of the S2S ML model. The sample audio content recording may be, for example, a single word, a single sentence, a one minute long speech, a five minute long speech, or others. The sample audio content is designed to train the S2S ML model to mimic a specific voice attribute present in the sample recording. Depending on how the voice attribute encoder is trained, this attribute may be the voice timbre, the accent, emotion, etc. or any combination of the aforementioned. Such encoder may be dynamic—designed to mimic a voice attribute in another recording without a predefined list of attributes.

Alternatively or additionally, the indication is an index of a record in a look-up table. The table includes vector representations of certain voice attributes. These representations are learned during the S2S ML model's training. For example, voice attribute encoder is trained to learn the attribute of voice timbre. The S2S model's supervisions are constructed in such a way that the index 0 is always seen with the timbre of speaker A, index 1 is seen with the timbre of speaker B, and so on. Such encoder may be static, designed to provide the voice attribute representations that were inserted in the look-up table during training.

At 406, a second audio content that includes speech having one or more second voice attributes is obtained. The first audio content and the second audio content have the same lexical content and/or are time-synchronized and/or lip synchronized, but differ in the selected voice attribute. The lexical content may include a sequence of words with their start and end timestamps relative to the start of the recording. The time-synchronization may include identical (or similar) rates of speech and/or preserved lip synchronization (e.g., to the largest extent possible). Verbal content and non-verbal content of the first audio content is preserved in the second audio content. For example, the first audio content is a paragraph read by one person with an accent common in a first geographical area, and the second audio content is the same paragraph read by another person with another accent common in a second geographical area, at the same speed and/or same tone as the first person.

The second audio content may be generated from the first audio content by being fed into a TTS ML model, for example, as described with reference to 712 of FIG. 7. Alternatively or additionally, the second audio content may be generated from the first audio content, for example, as described with reference to FIG. 6.

The process for synthesizing second audio content item described herein (for training the S2S ML model) is designed for preservation of lip synchronization, and/or time alignment, of the first audio content. The process helps guarantee that the synthesized second audio content has the same duration as the first audio content, and that every word (and/or non-verbal expression) is spoken at the same time (e.g., approximately or exactly within a margin of error) in both audio contents. The alignment is performed to help ensure that the S2S ML model is able to process speech in real-time.

At 408, a S2S record is created. The S2S record includes the first audio content obtained in 402, optionally the selection of second audio content obtained as in 404, and the second audio content 406. The second audio content serves as a ground truth label. The second audio content 406 includes the second voice attribute, which is the same as the selected voice attribute as in 404 when such selection exists. When no selection is done, the second voice attribute represents a default voice attribute which is used for records (e.g., all records) of the S2S training dataset.

At 410, an S2S training dataset of multiple S2S records is created by iterating features described with reference to 402-408, for different sample individuals, different audio contents, and/or different selected second voice attributes (or the same second voice attributes when no selection is explicitly provided).

At 412, the S2S ML model is trained using the S2S training dataset. The S2S ML model is trained for being fed an input of a source audio content with one or more source voice attributes corresponding to the first voice attribute, and in response to the feeding, generating an outcome of a target audio content with target voice attribute(s) corresponding to the second voice attribute of the second voice content. The S2S ML model is trained for preserving verbal content and non-verbal content of the source audio content. Examples of non-verbal content includes: tone of speech, rate of speech, utterance duration, emotional state, and voice clarity.

The S2S ML model is trained for generating the outcome of the target audio content, where the target audio content includes the source audio content with target voice attribute(s) instead of the source voice attribute(s). The target audio content with target voice attribute(s) is time aligned and has the same duration of the input source audio content with source voice attribute(s). Each word and other non-verbal expressions of the target audio content outcome of the S2S ML model is spoken at the same time as the input source audio content.

At 414, one or more S2S ML models may be trained, by iterating features described with reference to 402-410. For example, when there are multiple candidate second voice attributes, a respective S2S ML model is separately trained for each selected second voice attribute. Alternatively, a single S2S ML model is trained for generating multiple second voice attributes when a selection of the desired second voice attribute(s) is provided as input and/or is provided in the S2S records.

At 416, the S2S ML model(s) are provided.

Attention is now directed back to FIG. 5, which is a flowchart of near real-time adaptation of at least one voice attribute, in accordance with some embodiments of the present invention. During real-time adaptation, the rate of speech and/or utterance duration may be preserved.

Referring now back to FIG. 5, at 502, a certain ML model may be selected and/or accessed from multiple ML models, in the case where multiple ML models were trained. When the desired target voice attribute is known, the pre-trained ML model, and/or the ML model that accepts such target voice attribute as a selection is obtained. For example, the ML model that converts a first accent to a second accent may be selected.

At 504, a source audio content of speech having one or more source voice attributes is obtained. The source audio content may be, for example, obtained as a live (or near real time) stream, obtained as a file of pre-recorded audio content, and the like.

At 506, an indication of the target voice attribute to be generated in the target voice content may be obtained. The target voice attribute may be selected from multiple candidate voice attributes, for example, as an index and/or code. Alternatively, the target voice attribute may be extracted from a sample voice content of different content which depicts the target voice attribute.

The voice attribute may be explicitly selected and/or controlled, such as in the case where the static voice attribute encoder described herein is implemented. In such implementation, the source audio content with desired voice attribute is provided as input for generation of the target audio recording. For example, a user wishes to change their own voice to sound like a cartoon character by selecting the predefined voice attribute of Mickey Mouse, or to change their accent to a British English accent by selecting the predefined voice attribute of British English accent.

The voice attribute may be mimicked, rather than explicitly selected, by providing the sample voice content having the desired target voice attribute. For example, in the implementation of the dynamic voice attribute encoder described herein. In such implementation there may be no explicit control, rather the S2S model is trained to mimic a given attribute present in another audio content (e.g., utterance).

At 508, the source audio content with source voice attribute(s) is fed into the S2S ML model. The indication of the target voice attribute may be fed into the S2S ML model in combination with the source audio content.

Optionally, the source audio content is fed into the S2S ML model as described with reference to FIG. 6. FIG. 6 described an exemplary architecture of the S2S ML model that generates the target audio content from the source audio content.

Optionally, the feeding of the source audio content into the S2S ML model may be controlled, for example, by a voice activity detection system that may monitor a microphone to detect when speech is present. For example, when a user talking on the phone is speaking, rather than listening. The voice activity detection systems may have a small runtime footprint and/or be much simpler than Automatic Speech Recognition or Speech-to-Speech systems. Voice Activity Detection may be used to decide when to feed the audio content into S2S ML model, and when to simply pass the audio content through to reduce the consumption of system resources such as CPU and memory by the S2S ML model.

At 510, a target audio content is obtained as an outcome of the S2S ML model. The target audio content may be in a format suitable for playing on a speaker, and/or in a format suitable for feeding into a vocoder that generates an outcome suitable for playing on the speaker.

The target audio content includes the (optionally selected) target voice attribute, with the same lexical content as the source audio content. The target audio content and the source audio content are time-synchronized. Verbal content and/or non-verbal content of the source audio content is preserved in the target audio content.

At 512, the target audio content may be provided for playing on a speaker (e.g., for real time or near real time experience such as during a live phone call) and/or saved on a data storage device (e.g., in the format of a file for off-line listening, such as being played to callers waiting for a human operator). The speaker and/or data storage device may be local and/or remotely located. The target audio content may be forwarded to a remote location over a network. The target audio content may be played on a speaker and/or saved.

It is noted that the S2S model may generate high quality target audio content, with reduce or removed background noise and/or artifacts. The high quality audio may sound like a recording made, for example, with a good microphone, at a close distance to the microphone, with a quiet background, no distortions, no robotic voice, no glitches, and the like. The reduction or removal of background noise and/or artifacts are obtained from the training of the S2S ML model with paired audio content, where the targets (expected outputs) are synthesized with the TTS ML model system. When the TTS ML model is trained on high-quality data, the TTS ML model does not outputs audio content, i.e., speech, that includes background noise, distortion, etc. The S2S model is trained to "listen to" the real, noisy recordings and to transform them into clean, high-quality recordings obtained from TTS. This effect is preserved during inference time, since the synthesizer component of the S2S ML model is taught to produce high quality audio, optionally only high quality audio (more informally, it does "not know" how to synthesize the background noise, and the information about the background noise is expected already lost at the level of analyzer outputs, as the analyzer is trained to be an effective speech recognition model as well). In cases when the input data is extremely noisy or distorted to the level of being hard to understand for human listeners, the S2S ML model's behavior is less well defined, and the S2S ML model may output unintelligible speech.

Attention is now directed back to FIG. 6, which is a flowchart of an exemplary process for obtaining the target audio content from the source audio content by the S2S ML model, accordance with some embodiments of the present invention. The method described with reference to FIG. 6 is based on an exemplary architecture of the S2S ML model. The process described with reference to FIG. 6 may be used during training to generate the second audio content (e.g., used as ground truth), and/or during inference to generate an intermediate acoustic representation for being fed into a vocoder, for example, as described with reference to 508 of FIG. 5.

It is noted that components described with reference to FIG. 6 may be trained end-to-end. The end-to-end training is possible due to the synthesizing of paired audio content, as described herein.

The terms source and/or sample (e.g., during inference) and first (e.g., during training) are interchangeable. The terms target and/or sample (e.g., during inference) and second (e.g., during training) are interchangeable.

Referring now back to FIG. 6, at 602, the source audio content (or the first audio content) is fed into a feature extractor.

At 604, a first type of a first intermediate acoustic of the source audio content (or the first audio content) is obtained as an outcome of the feature extractor. The first type of the first intermediate acoustic representation may be implemented, for example, as a power-spectrum.

At 606, the first type of the first intermediate representation is fed into an analyzer component. The analyzer component is designed for "understanding" the speech.

It is noted the analyzer and/or feature extractor do not transcribe words of the source audio content into text, which may incur transcription errors, but rather generate intermediate representations which are designed to accurately capture features and/or voice attributes of the acoustic content.

At 608, a second type of the first intermediate acoustic representation of the source audio content (or the first audio content) is obtained as an outcome of the analyzer component. The second type of the first intermediate acoustic representation is designed to capture dynamic properties of speech that are related to pronunciation and/or phonetics.

The second type of the first intermediate acoustic representation may be implemented as, for example, a temporal sequence of learned neural network representations of spoken content of the source audio content (or of the first audio content). For example, one representation vector is outputted per time interval of speech, for example, per 5 milliseconds, or 10 milliseconds, or 20 milliseconds, or other values.

At 610, a second intermediate acoustic representation of the target voice attribute is obtained. The second intermediate acoustic representation may be implemented as a fixed-size vector representation of the encoded target voice attribute.

The second intermediate representation may be obtained by one of:
Obtaining a sample audio content having the target voice attribute, for example, from another sample individual that speaks with the target voice attribute. The sample audio content is fed into a voice attribute encoder that generates a second intermediate acoustic representation of the target voice attribute of the sample audio content.

The sample audio content may have different lexical content and/or different non-verbal aspects and/or different timing than the source audio content (or the first audio content). For example, the source audio content is obtained from an individual speaking with an accent from the Deep South of the US, and the sample audio content is obtained from another individual speaking with a New York accent while reading a newspaper. The New York accent represents the target voice attribute, while the Deep South accent represents the source voice attribute.

According to an indication of the target voice attribute, optionally selected from multiple candidate predefined voice attributes that were learned during training. For example, using an index and/or code indicating which of the predefined voice attributes is being selected.

At 612, the second type of the first intermediate acoustic representation of the first audio (e.g., source audio) is combined with the second intermediate acoustic representation of the target voice attribute (e.g., the second voice attribute) to obtain a combination. The combination may be performed, for example, by concatenation of the intermediate representations into a single vector, keeping the two intermediate representations as distinct data structures (e.g., two vectors) which are fed together (e.g., in parallel, simultaneously), and/or applying a mathematical operation to the two intermediate representations to get a single representation as an outcome (e.g., addition, multiplication).

At 614, the combination is fed into a synthesizer component. The combination is designed to influence the synthesizer and/or control the selected voice attribute(s). The synthesizer component is designed for synthesizing transformed speech. The synthesizer component may be specialized for the selected voice attributes and/or influenced by the voice attribute encoder described herein. It is noted that the synthesizer component may be designed for a more fine-grained control over non-verbal voice attributes of synthesize speech in comparison to typical speech synthesis systems, such as transfer of various non-verbal voice attributes from the source audio content to the destination audio content while adapting the selected voice attribute, while preserving the lexical content and/or timing and/or non-verbal content.

At 616, a third intermediate acoustic representation is obtained as an outcome of the synthesizer component. The third intermediate representation represents transformed speech, i.e., the source audio content (e.g., the first audio content) having the target voice attribute (e.g., the second voice attribute) replacing the original source voice attribute (e.g., the first voice attribute) in the source audio content. The lexical content, timing, and/or non-verbal content, and/or other voice attributes of the original source audio content are preserved.

At 618, the third intermediate acoustic representation is fed into a vocoder component, for example, implemented as a neural network.

At 620, the outcome of the vocoder component is provided. The outcome may be, for example, time-domain speech.

The outcome of the vocoder has the target voice attribute (e.g., the second voice attribute) replacing the original source voice attribute (e.g., the first voice attribute) in the source audio content while preserving the lexical content, timing, and/or non-verbal content, and/or other voice attributes of the original source audio content.

During inference, the outcome of the vocoder may be provided for playing on a speaker, for example, a file in an audio format, and/or streaming instructions in an audio format for playing on the speaker.

The outcome may be played on a speaker, for example, during real time phone calls. The outcome may be saved on a data storage device for future playbacks, for example, for playing to users on hold waiting to speak to a representative.

During training, the outcome of the vocoder may serve as the ground truth label of the S2S record.

Attention is now directed back to FIG. 7, which is a flowchart of a method of creating a text-to-speech (TTS) training dataset and training a TTS ML model on the TTS training dataset, in accordance with some embodiments of the present invention. The TTS ML model is used for generating the second audio content from the first audio content for creating S2S records for training the S2S ML model, as described herein. Optionally, the "second audio content" is the output of the system with target speaker/voice attribute that comes from running the system on "first audio content". The TTS ML model is used to generate pairs of matched audio records, which differ by a selected voice attribute, but that are otherwise similar (or the same) in terms of spoken content, timing, non-verbal content, and/or the non-selected voice attributes. It is noted that such matched audio pairs do not naturally exist and cannot naturally be obtained, since two people reading the same text will have different timing, different non-verbal content, and/or different non-selected voice attributes. As such, implementations described herein are designed to generate such matched pairs.

The TTS ML model may be implemented, for example, as a TTS model that works with alignments and so does not require an attention decoder, such as FastSpeech without duration predictor.

At 702, a text transcription of a third audio content comprising speech having the second voice attribute is obtained. The third audio content is the reference speech of target speaker/voice attribute used to train the TTS. The third audio content is a new audio content, which is different than the first audio content and the second audio content. The third audio content has the same voice attribute as the second voice attribute of the second audio content. For example, the same person that created the second voice audio content creates the third voice audio content, for example, by speaking words that are different than the first and second audio contents. The text transcript may be obtained, for example, by using the text that the person that created the third audio content read out loud, and/or by feeding the third audio content into a text-to-speech process that creates text transcripts from audio.

At 704, the third audio content that includes speech with the second voice attribute is obtained. For example, the third audio content that is fed into the text-to-speech process is used, or the audio recording created by the person reading the text transcript is used.

At 706, a TTS record is created. The TTS includes the text transcript as in 702, and a ground truth label assigned to the third audio content with the second voice attribute that has the text transcript has content thereof as in 704.

At 708, features 702-706 are iterated, to create a text-to-speech (TTS) training dataset of multiple records.

At 710, a TTS ML model is trained on the TTS training dataset. The TTS model is provided for generating the second audio content in response to an input of the first audio content, for creating S2S records for training the S2S ML model, as described herein.

It is noted that the TTS ML model may be designed for a more fine-grained control over non-verbal voice attributes of synthesize speech in comparison to typical speech synthesis systems, such as transfer of various non-verbal voice attributes from the source audio content to the destination audio content while adapting the selected voice attribute, while preserving the lexical content and/or timing and/or non-verbal content.

The TTS ML model may include one or more of the following exemplary components, representing an exemplary architecture. The components of the TTS ML model may be trained end-to-end.

A voice attribute encoder. The voice attribute encoder is designed for encoding a selected voice attribute into an intermediate representation designed to be fed into other components described herein. In the case where a third audio content spoken with the second voice attribute is provided, the voice attribute encoder learns the second voice attribute from the third audio content, and dynamically generates the second audio content having the second voice attribute in response to the input of the third audio content. Alternatively or additionally, in the case where the second audio content is selected from multiple candidate predefined voice attributes, the voice attribute encoder may statically generate the second audio content having the second voice attribute in response to the selection of the second voice attribute from the multiple candidate predefined voice attributes.

The voice attribute encoder is designed to generate a single representation vector for the whole inputted audio recording (e.g., utterance). The outcome of the voice attribute encoder may be designed to exclude information about the spoken content and/or to include data about the voice attributes of the audio content.

An encoder-decoder that generates a spectrogram in response to an input of words and corresponding word-level start and end time stamps of an input of the first audio content. The encoder-decoder may be implemented as one or more neural networks.

A duration based modeling predictor and controller that controls durations of phones of the second audio content in response to an input of word durations defined by the word-level start and end time stamps, It is noted that the duration based modeling predictor and controller is fed word durations and is not fed phone durations, which enables the duration based modeling predictor and controller to determine with reasonable durations of phones for the synthesized speech to sound authentic.

A vocoder that generates time-domain speech from the spectrogram. The vocoder may be implemented as one or more neural networks.

At 712, the TTS model is provided for creating the S2S record of the S2S training dataset.

At 714, the first audio content of the S2S record is obtained (e.g., accessed).

At 716, the first audio content of may be segmented into multiple segments, optionally single utterances, for example, a single words, single phrases, single sentences, and the like. Each S2S record may be for a single utterance. As such, a single first audio content may be used to create multiple S2S records.

At 718, the first audio content (or utterance), which includes speech with the first voice attribute, is fed into the TTS ML model.

Optionally, prior to feeding the first audio content into the TTS ML model, the first audio content and a text transcript of the first audio content is fed into a speech recognition alignment component. The transcript may be obtained, for example, as described herein with reference to the third audio content. In response to the input of the first audio content and the text transcript of the first audio content, the speech recognition alignment component generates an outcome of word-level start and end time stamps. The words with corresponding word-level start and end time stamps are fed into the TTS model (e.g., components thereof).

The speech recognition alignment component may be implemented, for example, as a neural network and/or a Gaussian Mixture Model Hidden Markov Model (GMM-HMM).

At 720, the second audio content with speech having the second voice attribute is obtained as an outcome of the TTS ML model. The second audio content serves as ground truth of the S2S record that also includes the first audio content.

The text transcript is the same for the first audio content and the second audio content, which preserves lexical content of the first audio content in the second audio content.

The timestamps of the speech recognition alignment component are used for preserving timing of the first audio content in the second audio content.

It is noted that the generated second audio content sound authentic and/or is a high quality recording.

Attention is now directed back to FIG. 8, which is a schematic 802 depicting real time conversion of a source audio content 804 with source voice attribute converted into a target audio content 806 with target voice attribute that preserves the lexical content and/or non-verbal content and/or timing and/or other voice attributes of the source audio content, in accordance with some embodiments of the present invention. Source audio content 804 may be recorded by a source individual speaking into a microphone 806. Source audio content 804 with source voice attribute is fed into a speech to speech ML model 808, as described herein. S2S ML model 808 generates target audio content 806 as an outcome. Target audio content 806 is an adaptation of the source voice attribute into the target voice attribute, Target audio content 806 may be played on a speaker 810. S2S ML model 808 allows, for example, real time communicate between two individuals via phone (that include microphones 806 and/or speakers 810) while dynamically adapting the source voice attribute to the target voice attribute, for example, real time adaptation of the accent and/or voice identity of the person speaking.

Dataflow 812 represents an exemplary architecture of S2S ML model 808, as described herein in detail. Briefly, an input 814 of the source audio content is fed into an analyzer component 816 that generates an intermediate representation in which the source voice attribute is adapted to the target voice attribute. The intermediate representation is fed into a synthesizer component 818 that generates an output 820 of the target audio content. It is noted that architecture of S2S ML model 812 may include additional components, as described herein in additional detail.

Attention is now directed back to FIG. 9, which is a schematic depicting different possible implementations of the S2S ML model, in accordance with some embodiments of the present invention. Diagram 902 indicates an adaptation of different audio content sources 904, each with a different source voice attribute, by a static implementation of the S2S ML model 906 (performing a many-to-one adaptation), to a single target voice attribute 906. The process described with reference to diagram 902 is sometimes referred to as voice conversion normalization.

Diagram 910 indicates an adaptation of different audio content sources 912, each with a different source voice attribute, by a dynamic S2S ML model 914 (performing a many-to-many adaptation), to a selected target voice attribute 916 of multiple available target voice attributes Dynamic S2S ML model 914 may be fed an indication of the selected target voice attribute, for example, as an index of a predefined table of available target voice attributes, and/or in a sample audio content that expresses the target voice attribute, as described herein. Examples of selections include: the target accent (e.g., British, American), the type of voice (e.g., there may be a set of available voices with an option to choose), preserve the original user voice without the accent, change both the original voice and original accent.

Dynamic S2S ML model 914 may be implemented as, for example:
  Multiple models: For each target voice attribute, a unique S2S ML model is trained. In the inference time, based on the user's choice, the relevant S2S ML model is selected and applied.
  Single unification model: a single S2S ML model is trained on multiple voice attributes, that can do the transformation. The set of selectable voice attributes is finite.
  Dynamically controllable model: a single S2S ML model is trained on multiple voices and conditioned on voice attribute representations, for example, from the Voice Attribute Encoder. The transformed voice attributes can be controlled during inference by providing a representation corresponding to a specific attribute and/or by providing a sample audio content that includes the target voice attribute. The set of selectable voice attributes is infinite.

Attention is now directed back to FIG. 10, which is a dataflow diagram 1502 depicting an exemplary approach for creating pairs of audio content for training a S2S ML model, in accordance with some embodiments of the present invention. The pairs of audio content differ in voice attributes but that have matching lexical content and/or are time synchronized and/or have matching non-verbal content and/or have matching other non-adapted voice attributes. Collecting audio content and making sure they are paired and/or assuring a large amount of data sufficient for training an ML model is challenging. Dataflow diagram 1502 is designed for generating data automatically, by takes input data representations and generating paired matched transformed data.

At 1504, multiple audio content items are obtained, for example, from existing sources (e.g., publicly available sources) and/or recordings of speakers (e.g., with different voice attributes). The audio content may be files. The audio content items may be designated as source and/or target, for example, native 1506 speakers (or other source voice attribute) and non-native speakers 1508 (or other target voice attributes). Each set of native 1506 and non-native 1508 audio content includes audio records and corresponding text transcripts 1506A and 1508A.

It is noted that native and non-native serve as examples of voice attributes, and are not necessarily limiting.

The native records and corresponding transcripts 1506A are used to train a TTS ML model 1510. TTS ML model 1510 is trained on a TTS training dataset of TTS records. A TTS record includes a transcript of the native recording and a ground truth label of the audio content with the native voice attribute. The transcript may be obtained, for example, automatically by a speech-to-text application and/or the transcript which is read by an individual with native accept to generate the audio content recording may be used.

Non-native records and transcripts 1508 include non-native transcripts 1512 and corresponding non-native recordings 1514 (i.e., of the transcript).

At 1516, non-native transcripts 1512 are fed into the trained TTS ML model to obtain synthesized native recordings 1518.

At 1520, the synthesized native recording 1518 is paired with the non-native recording 1514 whose transcript was used to create synthesized native recording 1518. The paired synthesized native recording 1518 and non-native recording 1514 have the same (or similar) lexical content and/or are time-synchronized and/or have same (or similar) non-verbal content and/or same (or similar) other voice attributes (other than native/non-native). The difference between paired synthesized native recording 1518 and non-native recording 1514 is in the native/non-native voice attribute At 1522, the S2S ML model is trained on the S2S training dataset of pairs of synthesized native recording 1518 and non-native recording 1514.

At inference 1524, a non-native audio recording 1526 is fed into trained S2S ML model to obtain a native audio recording 1528.

Attention is now directed back to FIG. 11, which is another dataflow diagram 1602 depicting an exemplary approach for creating pairs of audio content for training a S2S ML model, in accordance with some embodiments of the present invention. The pairs of audio content differ in voice attributes but that have matching lexical content and/or are time synchronized and/or have matching non-verbal content and/or have matching other non-adapted voice attributes. The pairs of audio content are used to train the S2S ML model described herein. Collecting audio content and making sure they are paired and/or assuring a large amount of data sufficient for training an ML model is challenging. Dataflow diagram 1502 is designed for generating data automatically, by takes input data representations and generating paired matched transformed data.

At 1604, source audio content with a source voice attribute are obtained.

At 1606, target audio content with a target voice attribute are obtained.

At 1608, a TTS ML model is trained on a TTS training dataset of TTS records. A TTS record includes a transcript of the target audio content and a ground truth label of the target audio content with the target voice attribute.

At 1610, the source audio recordings are fed into an trained automatic speech recognition component to obtain and corresponding source transcripts.

At 1612, the source audio recordings and/or corresponding source transcripts may be fed into an automated segmentation component that automatically segments the source audio recordings, for example, into individual utterances.

At 1614, the source audio recordings, optionally the segmentations thereof, and the corresponding transcripts are fed into an automatic alignment component that generates an outcome of word-level start and end time stamps.

At 1616, the words of the source audio recording (e.g., segmentations) with corresponding word-level start and end time stamps are fed into the TTS model for obtaining the second audio content, denoted as output recordings 1618. Output recordings 1618 serve as ground truth of a S2S record.

At 1620, the words of the source audio recording, optionally the segmentations, are denoted as input recordings. The input recordings are paired with the corresponding ground truth, and included in the S2S record.

At 1622, the S2S ML model is trained on multiple S2S records.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer-implemented method of training a speech-to-speech (S2S) machine learning (ML) model for adapting at least one voice attribute of speech, comprising:
creating an S2S training dataset of a plurality of S2S records, wherein an S2S record comprises:
a first audio content comprising speech having at least one first voice attribute,
and a ground truth label of a second audio content comprising speech having at least one second voice attribute,
wherein the first audio content and the second audio content have the same lexical content and are time-synchronized according to segment-level start and end timestamps,
wherein duration of phones of the second audio content are controlled in response to segment-level durations defined by the segment-level start and end time stamps;
creating a text-to-speech (TTS) training dataset of a plurality of TTS records, wherein a TTS record comprises a text transcription of a third audio content comprising speech having the at least one second voice attribute, and a ground truth indication of the third audio content comprising speech having the at least one second voice attribute;
training a TTS ML model on the TTS training dataset,
wherein the S2S record of the S2S training dataset is created by:
feeding the first audio content comprising speech having the at least one first voice attribute into the TTS ML model, wherein the first audio content is of the S2S record,
wherein feeding the first audio content into the TTS model further comprises:
segmenting the first audio content into segments comprising a plurality of single utterances, wherein the S2S record is for a single utterance;
feeding the first audio content into a speech recognition alignment component that in response to an input of the first audio content and a text transcript of the first audio content, generates an outcome of the segment-level start and end time stamps, and feeding the segments with corresponding ones of the segment-level start and end time stamps into the TTS ML model for obtaining the second audio content as the outcome of the TTS ML model, wherein the text transcript is the same for the first audio content and the second audio content; and
obtaining the second audio content comprising speech having the at least one second voice attribute as the outcome of the TTS ML model, wherein the second audio content is of the S2S record;
wherein the TTS ML model comprises:
a voice attribute encoder that at least one of: dynamically generates the second audio content having the at least one second voice attribute in response to an input of the third audio content comprising speech having the at least one second voice attribute, statically generates the second audio content having the at least one second voice attribute in response to a selection of the at least one second voice attribute from a plurality of candidate voice attributes, and statistically generates the second audio content having the at least one second voice attribute,
an encoder-decoder that generates a spectrogram in response to an input of the segments and corresponding ones of the segment-level start and end time stamps, a duration based modeling predictor and controller that controls durations of phones of the second audio content in response to an input of the segment durations defined by the segment-level start and end time stamps, and a vocoder that generates time-domain speech from the spectrogram; and training the S2S ML model using the S2S training dataset, wherein the S2S ML model is fed an input of a source audio content with at least one source voice attribute and generates an outcome of the source audio content with at least one target voice attribute.

2. The computer-implemented method of claim 1, wherein the S2S ML model generates the outcome of the source audio content with the at least one target voice attribute as time aligned and having the same duration of the input source audio content with at least one source voice attribute, and each word and other non-verbal expressions of the outcome of the source audio content is spoken at the same time as the input source audio content.

3. The computer-implemented method of claim 1, wherein the plurality of candidate voice attributes comprise a non-verbal aspect of speech, selected from a group comprising: pronunciation, accent, voice timbre, voice identity, emotion, expressiveness, gender, age, and body type.

4. The computer-implemented method of claim 1, wherein verbal content and at least one non-verbal content of the first audio content is preserved in the second audio content and the S2S ML model is trained for preserving the verbal content and the at least one non-verbal content of the source audio content.

5. The computer-implemented method of claim 4, wherein the at least one non-verbal content is selected from a group comprising: tone of speech, rate of speech, utterance duration, emotional state, and voice clarity.

6. The computer-implemented method of claim 1, further comprising:

feeding the first audio content into a feature extractor that generates a first type of a first intermediate acoustic representation of the first audio content;

feeding the first type of the first intermediate representation into an analyzer component that generates a second type of the first intermediate acoustic representation of the first audio content;

at least one of: (i) feeding the second audio content into the voice attribute encoder that generates a second intermediate acoustic representation of the at least one second voice attribute of the second audio content, and (ii) obtaining the second intermediate acoustic representation of the second audio by indicating the at least one second voice attribute of the second audio content;

combining the second type of the first intermediate acoustic representation of the first audio with the second intermediate acoustic representation of the second audio to obtain a combination, and feeding the combination into a synthesizer component that generates a third intermediate acoustic representation representing the first audio content having the at least one second voice attribute;

wherein the S2S record includes at least one of:

(i) the combination and the ground truth label comprises the third intermediate acoustic representation; and (ii) the second type of the first intermediate acoustic representation of the first audio content, and the ground truth comprises the third intermediate acoustic representation.

7. The computer implemented method of claim 6, wherein the third intermediate acoustic representation is designed for being fed into the vocoder that generates an outcome for playing on a speaker with the at least one second voice attribute while preserving lexical content and non-adapted non-verbal attributes of the first audio content.

8. The computer implemented method of claim 1, wherein a respective S2S ML model is separately trained for each selected second voice attribute.

9. The computer implemented method of claim 1, wherein the S2S record of the S2S training dataset further includes an indication of a certain at least one second voice attribute selected from the plurality of candidate voice attributes, and the S2S ML model is further fed the at least one target voice attribute for generating the outcome of the source audio content having the at least one target voice attribute.

10. A computer implemented method of near real-time adaptation of at least one voice attribute, comprising:

feeding the source audio content comprising speech having at least one source voice attribute into the S2S ML model trained as in claim 1; and obtaining a target audio content as the outcome of the S2S ML model for playing on a speaker, wherein the target audio content comprises at least one target voice attribute of the source audio content, and the target audio content and the source audio content have the same lexical content and are time-synchronized according to the segment-level start and end timestamps.

11. The computer implemented method of claim 10, further comprising:

feeding the source audio content into a feature extractor that generates a first type of a first intermediate acoustic representation of the source audio content.

12. The computer implemented method of claim 11, wherein the first type of the first intermediate acoustic representation comprises a power-spectrum.

13. The computer implemented method of claim 11, further comprising:

feeding the first type of the first intermediate representation into an analyzer component that generates a second type of the first intermediate acoustic representation of the source audio content.

14. The computer implemented method of claim 13, wherein the second type of the first intermediate acoustic representation comprises a temporal sequence of learned neural network representations of spoken content of the source audio content.

15. The computer implemented method of claim 13, further comprising:

at least one of:

(i) obtaining a sample audio content having the at least one target voice attribute, feeding the sample audio content into the voice attribute encoder that generates a second intermediate acoustic representation of the at least one target voice attribute of the sample audio content, and (ii) obtaining the second intermediate acoustic representation of the at least one target voice attribute according to an indication of the at least one target voice attribute.

16. The computer implemented method of claim 15, wherein the second intermediate acoustic representation comprises a fixed-size vector representation of the encoded at least one target voice attribute.

17. The computer implemented method of claim 15, wherein the indication of the at least one target voice attribute is selected from the plurality of candidate voice attributes that are learned during training.

18. The computer implemented method of claim 15, further comprising:
combining the second type of the first intermediate acoustic representation of the first audio with the second intermediate acoustic representation of the at least one target voice attribute to obtain a combination, and feeding the combination into a synthesizer component that generates a third intermediate acoustic representation representing the source audio content having the at least one target voice attribute.

19. The computer implemented method of claim 18, further comprising
feeding the third intermediate acoustic representation into the vocoder component that generates an outcome having the at least one target voice attribute for playing on the speaker while preserving the lexical content and non-adapted non-verbal attributes of the source audio content.

20. The computer-implemented method of claim 1, wherein the second audio content is generated from the first audio content using the segment-level start and end timestamps of the first audio content.

21. The computer-implemented method of claim 1, wherein the segment-level start and end timestamps are selected from a group consisting of: word-level start and end timestamps, phrase-level start and end timestamps, sentence-level start and end timestamps, and syllable-level start and end timestamps.

22. A system for training a speech-to-speech (S2S) machine learning (ML) model for adapting at least one voice attribute of speech, comprising:
at least one hardware processor executing a code for:
creating a S2S training dataset of a plurality of S2S records, wherein a S2S record comprises:
a first audio content comprising speech having at least one first voice attribute,
and a ground truth label of a second audio content comprising speech having at least one-second voice attribute,
wherein the first audio content and the second audio content have the same lexical content and are time-synchronized according to segment-level start and end timestamps,
wherein duration of phones of the second audio content are controlled in response to segment-level durations defined by the segment-level start and end time stamps;
creating a text-to-speech (TTS) training dataset of a plurality of TTS records, wherein a TTS record comprises a text transcription of a third audio content comprising speech having the at least one second voice attribute, and a ground truth indication of the third audio content comprising speech having the at least one second voice attribute;
training a TTS ML model on the TTS training dataset, wherein the S2S record of the S2S training dataset is created by:
feeding the first audio content comprising speech having the at least one first voice attribute into the TTS ML model, wherein the first audio content is of the S2S record,
wherein feeding the first audio content into the TTS model further comprises:
segmenting the first audio content into segments comprising a plurality of single utterances, wherein the S2S record is for a single utterance;
feeding the first audio content into a speech recognition alignment component that in response to an input of the first audio content and a text transcript of the first audio content, generates an outcome of the segment-level start and end time stamps, and feeding the segments with corresponding ones of the segment-level start and end time stamps into the TTS ML model for obtaining the second audio content as the outcome of the TTS ML model, wherein the text transcript is the same for the first audio content and the second audio content; and
obtaining the second audio content comprising speech having the at least one second voice attribute as the outcome of the TTS ML model, wherein the second audio content is of the S2S record;
wherein the TTS ML model comprises:
a voice attribute encoder that at least one of: dynamically generates the second audio content having the at least one second voice attribute in response to an input of the third audio content comprising speech having the at least one second voice attribute, statically generates the second audio content having the at least one second voice attribute in response to a selection of the at least one second voice attribute from a plurality of candidate voice attribute, and statistically generates the second audio content having the at least one second voice attribute,
an encoder-decoder that generates a spectrogram in response to an input of the segments and corresponding ones of the segment-level start and end time stamps,
a duration based modeling predictor and controller that controls durations of phones of the second audio content in response to an input of the segment durations defined by the segment-level start and end time stamps, and
a vocoder that generate time-domain speech from the spectrogram; and
training the S2S ML model using the S2S training dataset, wherein the S2S ML model is fed an input of a source audio content with at least one source voice attribute and generates an outcome of the source audio content with at least one target voice attribute.

23. A computer-implemented method of training a speech-to-speech (S2S) machine learning (ML) model for adapting at least one voice attribute of speech, comprising:
creating an S2S training dataset of a plurality of S2S records, wherein an S2S record comprises:
a first audio content comprising speech having at least one first voice attribute,
and a ground truth label of a second audio content comprising speech having at least one second voice attribute,
wherein the first audio content and the second audio content have the same lexical content and are time-synchronized;
creating a text-to-speech (TTS) training dataset of a plurality of TTS records, wherein a TTS record comprises a text transcription of a third audio content comprising speech having the at least one second voice attribute, and a ground truth indication of the third audio content comprising speech having the at least one second voice attribute;
training a TTS ML model on the TTS training dataset, wherein the S2S record of the S2S training dataset is created by:
- segmenting the first audio content into segments comprising a plurality of single utterances, wherein the S2S record is for a single utterance;
- feeding the first audio content of the S2S record comprising speech having the at least one first voice attribute into a speech recognition alignment component that in response to an input of the first audio content and text transcript of the first audio content, generates an outcome of segment-level start and end time stamps;
- feeding the segments with corresponding ones of the segment-level start and end time stamps into the TTS ML model for obtaining the second audio content as the outcome of the TTS ML model, wherein the text transcript is the same for the first audio content and the second audio content; and
- obtaining the second audio content comprising speech having the at least one second voice attribute as the outcome of the TTS ML model, wherein the second audio content is of the S2S record;

wherein the TTS ML model comprises:
- a voice attribute encoder that at least one of: dynamically generates the second audio content having the at least one second voice attribute in response to an input of the third audio content comprising speech having the at least one second voice attribute, statically generates the second audio content having the at least one second voice attribute in response to a selection of the at least one second voice attribute from a plurality of candidate voice attributes, and statistically generates the second audio content having the at least one second voice attribute,
- an encoder-decoder that generates a spectrogram in response to an input of the segments and corresponding ones of the segment-level start and end time stamps,
- a duration based modeling predictor and controller that controls durations of phones of the second audio content in response to an input of segment durations defined by the segment-level start and end time stamps, and
- a vocoder that generates time-domain speech from the spectrogram; and training the S2S ML model using the S2S training dataset, wherein the S2S ML model is fed an input of a source audio content with at least one source voice attribute and generates an outcome of the source audio content with at least one target voice attribute.

* * * * *